US012626831B2

(12) United States Patent
Bass et al.

(10) Patent No.: US 12,626,831 B2
(45) Date of Patent: May 12, 2026

(54) DISTRIBUTED MODULAR NUCLEAR POWER PLANT LAYOUT ARCHITECTURE

(71) Applicant: GE-Hitachi Nuclear Energy Americas LLC, Wilmington, NC (US)

(72) Inventors: Derek Bass, Wilmington, NC (US); Dennis Henneke, Wilmington, NC (US); Tatjana B. Kirby, Wilmington, NC (US); Luben I. Todorovski, Wilmington, NC (US); Mark J. Endre, Wilmington, NC (US)

(73) Assignee: GE-Hitachi Nuclear Energy Americas LLC, Wilmington, NC (US)

( * ) Notice: Subject to any disclaimer, the term of this patent is extended or adjusted under 35 U.S.C. 154(b) by 0 days.

(21) Appl. No.: 18/484,037

(22) Filed: Oct. 10, 2023

(65) Prior Publication Data

US 2024/0079155 A1 Mar. 7, 2024

Related U.S. Application Data

(62) Division of application No. 17/718,696, filed on Apr. 12, 2022, now Pat. No. 11,842,821.

(Continued)

(51) Int. Cl.

| | |
|---|---|
| ***G21C 9/04*** | (2006.01) |
| ***G21D 1/02*** | (2006.01) |
| ***G21D 3/04*** | (2006.01) |

(52) U.S. Cl.

CPC ................. *G21D 1/02* (2013.01); *G21D 3/04* (2013.01); *G21C 9/04* (2013.01)

(58) Field of Classification Search

CPC ............... G21C 9/04; G21D 1/02; G21D 3/04

See application file for complete search history.

(56) References Cited

U.S. PATENT DOCUMENTS 9,547,328 B2 * 1/2017 Kakunda ................ G21D 3/001
9,620,252 B2 * 4/2017 Graham ................... G21C 9/00

(Continued)

FOREIGN PATENT DOCUMENTS

CN 103850483 A * 6/2014
CN 112414472 A 2/2021

(Continued)

OTHER PUBLICATIONS

International Preliminary Report on Patentability issued Oct. 12, 2023 for corresponding International Application No. PCT/US2022/024379.

(Continued)

*Primary Examiner* — Lily C Garner

(74) *Attorney, Agent, or Firm* — HARNESS, DICKEY & PIERCE, P.L.C.

(57) ABSTRACT

A nuclear power plant includes a nuclear structure, a frontline support equipment, and a support structure. The nuclear structure includes, and is configured to protect from incurring damage due to a damaging event, at least one of a nuclear reactor or a nuclear fuel storage. The frontline support equipment is configured to perform a fundamental safety function. The support structure is spatially separate from the nuclear structure and includes an initiating support equipment configured to trigger the frontline support equipment to perform the fundamental safety function such that the fundamental safety function is performed independently of the initiating support equipment subsequent to the triggering. The support structure may be a non-protected structure that is not configured to protect the initiating support equipment from incurring damage due to the damaging event.

15 Claims, 12 Drawing Sheets

Related U.S. Application Data

(60) Provisional application No. 63/174,355, filed on Apr. 13, 2021.

(56) References Cited

U.S. PATENT DOCUMENTS

| | | | | | |
|---|---|---|---|---|---|
| 9,892,807 | B2 * | 2/2018 | Hyde | G21D 1/02 | |
| 10,445,160 | B2 * | 10/2019 | Pottorf | G06F 11/00 | |
| 10,446,279 | B2 * | 10/2019 | Onishi | G21D 1/02 | |
| 10,510,455 | B2 * | 12/2019 | Hough | G21D 3/008 | |
| 10,672,528 | B2 * | 6/2020 | Ingersoll | G21C 1/32 | |
| 12,176,117 | B2 * | 12/2024 | Cheatham, III | F01K 3/181 | |
| 2011/0160922 | A1 * | 6/2011 | Santos | H04L 67/125 | 709/227 |
| 2012/0207261 | A1 * | 8/2012 | Noel | G21D 1/00 | 376/277 |
| 2013/0044851 | A1 * | 2/2013 | Winters | G21C 15/182 | 376/299 |
| 2013/0272471 | A1 * | 10/2013 | Graham | G21C 9/00 | 376/277 |
| 2014/0324356 | A1 * | 10/2014 | Park | G01M 5/0066 | 702/15 |
| 2016/0189811 | A1 * | 6/2016 | Pottorf | G21D 3/06 | 376/247 |
| 2017/0178757 | A1 * | 6/2017 | Hough | G21D 3/04 | |
| 2020/0135345 | A1 * | 4/2020 | Kutsch | F03G 6/065 | |
| 2021/0098143 | A1 * | 4/2021 | Trojer | B63B 77/00 | |

FOREIGN PATENT DOCUMENTS

| | | | | |
|---|---|---|---|---|
| CN | 113707348 | A | 11/2021 | |
| CN | 115478721 | A * | 12/2022 | E04H 5/02 |
| EP | 2728584 | B1 * | 3/2018 | G21D 3/04 |
| GB | 2203875 | A | 10/1988 | |
| JP | S57-48679 | A | 3/1982 | |
| JP | S60151599 | A | 8/1985 | |
| JP | 2004-529353 | A | 9/2004 | |
| JP | 2006-300209 | A | 11/2006 | |
| JP | 2020-518823 | A | 6/2020 | |

OTHER PUBLICATIONS

"The ABWR Plant General Description," document dated 2007, available at web page <https://nuclear.gepower.com/content/dam/gepower-nuclear/global/en_US/documents/ABWR%20General%20Description%20Book.pdf>, available at least as of Feb. 16, 2021 per Internet Archive Wayback Machine <https://web.archive.org/web/20210216170723/https://nuclear.gepower.com/content/dam/gepower-nuclear/global/en_US/documents/ABWR%20General%20Description%20Book.pdf>, retrieved on Feb. 23, 2022, 148 pages.

"The Westinghouse Advanced Passive Pressurized Water Reactor, AP1000," SFEN annual convention: light water reactors—their place in the 21 century, France, 2009, available at web page <https://inis.iaea.org/collection/NCLCollectionStore/_Public/42/026/42026956.pdf>, retrieved on Feb. 23, 2022, 24 pages.

"GE Power & Water, 'Combined Cycle Power Plant Best Practices,'" available at web page <https://docplayer.net/61912174-Ge-power-water-combined-cycle-power-plant-best-practices-ge-proprietary-information-general-electric.html>, available at least as of 2018, retrieved on Feb. 23, 2022, 107 pages.

"Simplified Plant Arrangement—Nuclear Street," Web page <https://nuclearstreet.com/nuclear-power-plants/w/nuclear_power_plants/simplified-plant-arrangement>, Apr. 12, 2011, retrieved on Apr. 25, 2022, 3 pages.

DOE Standard DOE-STD-1189-2008, "Integration of Safety Into the Design Process," Mar. 2008, 191 pages.

NRC Regulatory Guide 1.29, Revision 5, "Seismic Design Classification for Nuclear Power Plants," Jul. 2016, 11 pages.

NRC Regulatory Guide 1.76, Revision 1, "Design-Basis Tornado and Tornado Missiles for Nuclear Power Plants," Mar. 2007, 12 pages.

ANSI/AISC N690-18, "Specification for Safety-Related Steel Structures for Nuclear Facilities," American National Standards Institute, American Institute of Steel Construction, Jun. 28, 2018, 196 pages, available at Web page < https://www.aisc.org/globalassets/aisc/publications/standards/n690-18w.pdf>, retrieved on Apr. 25, 2022.

10 C.F.R. § 50, Appendix B (2021), "Quality Assurance Criteria for Nuclear Power Plants and Fuel Reprocessing Plants" U.S. Government Publishing Office, available at Web page <https://www.govinfo.gov/content/pkg/CFR-2021-title10-vol1/pdf/CFR-2021-title 10-vol1-part50-appB.pdf>, retrieved Jul. 5, 2022, 5 pages.

10 C.F.R. § 50, Appendix A (2021), "General Design Criteria for Nuclear Power Plants," U.S. Government Publishing Office, available at Web page <https://www.govinfo.gov/content/pkg/CFR-2021-title10-vol1/pdf/CFR-2021-title10-vol1-part50-appA.pdf>, retrieved Jul. 5, 2022, 10 pages.

10 C.F.R. § 50.34 (2021), "Contents of Applications; Technical Information," U.S. Government Publishing Office, available at Web page <https://www.govinfo.gov/content/pkg/CFR-2021-title10-vol1/pdf/CFR-2021-title 10-vol1-sec50-34.pdf>, retrieved Jul. 5, 2022, 12 pages.

10 C.F.R. § 52.79 (2021), "Contents of Applications; Technical Information in Final Safety Analysis Report," U.S. Government Publishing Office, available at Web page <https://www.govinfo.gov/content/pkg/CFR-2021-title10-vol2/pdf/CFR-2021-title10-vol2-sec52-79.pdf>, retrieved Jul. 5, 2022, 8 pages.

10 C.F.R. § 20.1301 (2021), "Dose Limits for Individual Members of The Public," U.S. Government Publishing Office, available at Web page < https://www.govinfo.gov/content/pkg/CFR-2021-title 10-vol. 1/pdf/CFR-2021-title10-vol1-sec20-1301.pdf>, retrieved Jul. 5, 2022, 2 pages.

ANSI/ANS-2.26-2004, "Categorization of Nuclear Facility Structures, Systems, and Components for Seismic Design," American Nuclear Society, 2004 edition reaffirmed 2021, pp. 1-23.

ASCE/SEI 43-19, "Seismic Design Criteria for Structures, Systems, and Components in Nuclear Facilities," American Society of Civil Engineers, 2019, p. i-xvii and pp. 1-88.

ASCE/SEI 4-16, "Seismic Analysis of Safety-Related Nuclear Structures," American Society of Civil Engineers, 2017, pp. i-xxxi and pp. 1-171.

ASME Boiler and Pressure Vessel Code (BPVC), Section III, "Rules for Construction of Nuclear Facility Components," Subsection NCA, "General Requirements for Division 1 and Division 2," American Society of Mechanical Engineers, 2021, pp. 1-78.

ACI 349-13, "Code Requirements for Nuclear Safety-Related Concrete Structures," American Concrete Institute, Jun. 2014, pp. 1-196.

ANSI/ANS-2.8-2019, "Probabilistic Evaluation of External Flood Hazards for Nuclear Facilities," American Nuclear Society, 2019, pp. 1-68.

"International Building Code (IBC)," International Code Council, 2017, pp. 1-728.

ACI 318-19, "Building Code Requirements for Structural Concrete," American Concrete Institute, Jun. 2019, pp. 1-623.

ANSI/AISC 360-16, "Specification for Structural Steel Buildings," American Institute of Steel Construction, Jul. 7, 2016, 676 pages.

10 C.F.R. § 100 (2011), "Reactor Site Criteria," U.S. Government Publishing Office, available at Web page <https://www.govinfo.gov/content/pkg/CFR-2011-title10-vol2/pdf/CFR-2011-title10-vol2-part100.pdf>, retrieved Jul. 15, 2022, 16 pages.

Invitation to Pay Additional Fees and Partial Search Report dated Sep. 7, 2022 for corresponding Application No. PCT/US2022/024379.

International Search Report and Written Opinion thereof dated Oct. 28, 2022 for corresponding International Application No. PCT/US2022/024379, 22 pages.

Singh et al., "Acceptable Seismic Risks at Nuclear Facilities", https://www.osti.gov/servlets/purl/1109337, Jul. 17-21, 2011.

European Office Action dated Mar. 20, 2025 for Corresponding European Application No. 22727517.9.

Japanese Office Action for Japanese Patent Application No. 2023-561094 issued on Feb. 18, 2025, and English translation thereof.

Japanese Notice of Allowance dated Jul. 15, 2025 for corresponding Japanese Patent Application No. 2023-561094.

(56) References Cited

OTHER PUBLICATIONS

Canadian Office Action dated Sep. 10, 2025 for corresponding Canadian Patent Application No. 3215501.

* cited by examiner

DISTRIBUTED MODULAR NUCLEAR POWER PLANT LAYOUT ARCHITECTURE

CROSS-REFERENCE TO RELATED APPLICATIONS

The present application is a divisional of U.S. application Ser. No. 17/718,696, filed Apr. 12, 2022, which is a non-provisional application that claims priority to U.S. provisional application No. 63/174,355, filed on Apr. 13, 2021, the contents of each of which are incorporated by reference in their entirety.

BACKGROUND

Field

Example embodiments described herein relate in general to nuclear power plants and in particular to providing a nuclear power plant having a distributed modular layout architecture.

Description of Related Art

Traditional nuclear reactor buildings use a monolithic modular architecture where many of the auxiliary nuclear support systems, (e.g., coolant cleanup equipment, emergency core cooling systems, residual heat removal systems, emergency power supplies, etc.) are in near proximity to the nuclear reactor vessel and/or are within a common ("same") structure ("building") with the nuclear reactor (e.g., a nuclear reactor building, also referred to as a nuclear reactor containment building). This is traditionally done because some of the auxiliary nuclear support systems are relied upon to perform fundamental safety functions during and following external or specific internal events that are associated with damage being incurred by one or more portions of the nuclear power plant (including, for example, the nuclear reactor and/or nuclear fuel storage). Such events may be referred to herein as "damaging events."

SUMMARY

According to some example embodiments, a nuclear power plant may include a nuclear structure, a frontline support equipment, and a support structure. The nuclear structure may include at least one of a nuclear reactor or a nuclear fuel storage. The nuclear structure may be a protected structure configured to protect the at least one of the nuclear reactor or the nuclear fuel storage from incurring damage due to a damaging event. The damaging event may originate externally to the protected structure. The damaging event may be associated with damage being incurred by at least a portion of the nuclear power plant. The frontline support equipment may be configured to perform a fundamental safety function. The fundamental safety function may include at least one of controlling a reactivity of the nuclear reactor, cooling a reactor radioactive material in the nuclear reactor, cooling a stored radioactive material in the nuclear fuel storage, or confining a particular radioactive material within an enclosure of a container or suitably filtering to suppress a release of the particular radioactive material from the container. The support structure may be spatially separate from the protected structure. The support structure may include an initiating support equipment. The initiating support equipment may be configured to trigger the frontline support equipment to perform the fundamental safety function such that the fundamental safety function is performed independently of the initiating support equipment subsequent to the triggering.

The support structure may be a non-protected structure that is not configured to protect the initiating support equipment from incurring damage due to the damaging event.

The initiating support equipment may be not configured to resist incurring damage due to the damaging event. The initiating support equipment may be configured to trigger the frontline support equipment to perform the fundamental safety function in response to detection of the damaging event and prior to the initiating support equipment incurring damage due to the damaging event, such that the fundamental safety function is performed independently of damage incurred by the initiating support equipment due to the damaging event.

The nuclear structure may be configured to meet requirements for a first-tier Seismic Design Category (SDC) that is at least one of SDC-3, SDC-4, or SDC-5 according to ANSI/ANS-2.26-2004 and/or ASCE/SEI 43-19. The support structure may be configured to meet requirements for a second-tier SDC that is different from the first-tier SDC. The second-tier Seismic Design Category may be at least one of Non-Seismic, SDC-1, or SDC-2 according to ANSI/ANS-2.26-2004 and/or ASCE/SEI 43-19.

The nuclear power plant may further include a first cluster of structures associated with mechanical equipment, the first cluster including the nuclear structure. The nuclear power plant may further include a second cluster of structures associated with electrical equipment, instrumentation equipment, control equipment, and/or communication equipment, the second cluster including the support structure. A majority of mechanical equipment of the nuclear power plant may be located within the first cluster of structures and a majority of electrical equipment, instrumentation equipment, control equipment, and/or communication equipment of the nuclear power plant may be located within the second cluster of structures. The first and second clusters may be spatially separate from each other such that a smallest distance between a structure of the first cluster and a structure of the second cluster is greater than both a first average distance between adjacent structures of the first cluster and a second average distance between adjacent structures of the second cluster.

At least 80% of all mechanical equipment of the nuclear power plant may be located within the first cluster of structures and at least 80% of electrical equipment, instrumentation equipment, control equipment, and/or communication equipment of the nuclear power plant may be located within the second cluster of structures.

The fundamental safety function may include confining the particular radioactive material within the enclosure of the container to suppress the release of the particular radioactive material from the container. The frontline support equipment may be a valve configured to be actuated to selectively isolate the enclosure of the container from an exterior of the container. The initiating support equipment may include an actuator configured to actuate the valve.

The container may be located within the support structure, and the container may be configured to protect the enclosure from being breached due to the damaging event.

The initiating support equipment may include detection equipment configured to detect the damaging event.

The frontline support equipment may be located within the nuclear structure.

The damaging event may include at least one of a seismic event, a weather event, a malevolent act on the nuclear power plant, or a fire within a particular proximity range of the nuclear structure.

According to some example embodiments, a method of operation of a nuclear power plant, the nuclear power plant including a nuclear structure, the nuclear structure including at least one of a nuclear reactor or a nuclear fuel storage, may include detecting a damaging event originating externally to the nuclear structure and associated with damage being incurred by one or more portions of the nuclear power plant, wherein the nuclear structure is a protected structure configured to protect the at least one of the nuclear reactor or the nuclear fuel storage from incurring damage due to the damaging event. The method may include controlling an initiating support equipment to trigger a frontline support equipment to perform a fundamental safety function in response to the detecting the damaging event, such that the fundamental safety function is performed independently of the initiating support equipment subsequent to the triggering, the initiating support equipment located in a support structure that is spatially separate from the nuclear structure. The fundamental safety function may include at least one of controlling a reactivity of the nuclear reactor, cooling a reactor radioactive material in the nuclear reactor, cooling a stored radioactive material in the nuclear fuel storage, or confining a particular radioactive material within an enclosure of a container to suppress a release of the particular radioactive material from the container.

At least one of the support structure or the initiating support equipment may be not configured to resist incurring damage due to the damaging event. The method may include the initiating support equipment triggering the frontline support equipment to perform the fundamental safety function prior to the support structure and/or the initiating support equipment incurring damage due to the damaging event, such that the fundamental safety function is performed independently of damage incurred by the support structure and/or the initiating support equipment due to the damaging event.

According to some example embodiments, a method for constructing a nuclear power plant having a distributed modular nuclear power plant layout architecture may include constructing a nuclear structure. The nuclear structure may include at least one of a nuclear reactor or a nuclear fuel storage. The nuclear structure may be a protected structure configured to protect the at least one of the nuclear reactor or the nuclear fuel storage from incurring damage due to an occurrence of a damaging event. The damaging event may originate externally to the protected structure. The damaging event may be associated with damage being incurred by at least a portion of the nuclear power plant. The method may include constructing a support structure that is spatially separate from the protected structure. The support structure may include an initiating support equipment. The initiating support equipment may be configured to trigger a frontline support equipment to perform a fundamental safety function such that the fundamental safety function is performed independently of the initiating support equipment subsequent to the triggering. The fundamental safety function may include at least one of controlling a reactivity of the nuclear reactor, cooling a reactor radioactive material in the nuclear reactor, cooling a stored radioactive material in the nuclear fuel storage, or confining a particular radioactive material within an enclosure of a container or suitably filtering to suppress a release of the particular radioactive material from the container. The nuclear structure and the support structure may be constructed at least partially concurrently.

The support structure may be a non-protected structure that is not configured to protect the initiating support equipment from incurring damage due to the occurrence of the damaging event.

The frontline support equipment may be located within the nuclear structure.

The nuclear structure may be constructed to meet requirements for a first-tier SDC that is at least one of SDC-3, SDC-4, or SDC-5 according to ANSI/ANS-2.26-2004 and/or ASCE/SEI 43-19. The support structure may be constructed to meet requirements for a second-tier SDC that is different from the first-tier SDC. The second-tier SDC may be at least one of Non-Seismic, SDC-1, or SDC-2 according to ANSI/ANS-2.26-2004 and/or ASCE/SEI 43-19.

According to some example embodiments, a nuclear power plant may include spatially separated first and second sets of adjacent structures. The first set of adjacent structures may be associated with nuclear fuel handling and may include a fuel handling building containing a nuclear fuel storage, an auxiliary structure associated with the nuclear fuel storage, and an annex structure associated with the nuclear fuel storage. The second set of adjacent structures may be associated with a nuclear reactor and may include a nuclear reactor building containing the nuclear reactor, an auxiliary structure associated with the nuclear reactor, and an annex structure associated with the nuclear reactor.

BRIEF DESCRIPTION OF THE DRAWINGS

The various features and advantages of the non-limiting embodiments herein may become more apparent upon review of the detailed description in conjunction with the accompanying drawings. The accompanying drawings are merely provided for illustrative purposes and should not be interpreted to limit the scope of the claims. The accompanying drawings are not to be considered as drawn to scale unless explicitly noted. For purposes of clarity, various dimensions of the drawings may have been exaggerated.

DETAILED DESCRIPTION

Figure 1A:
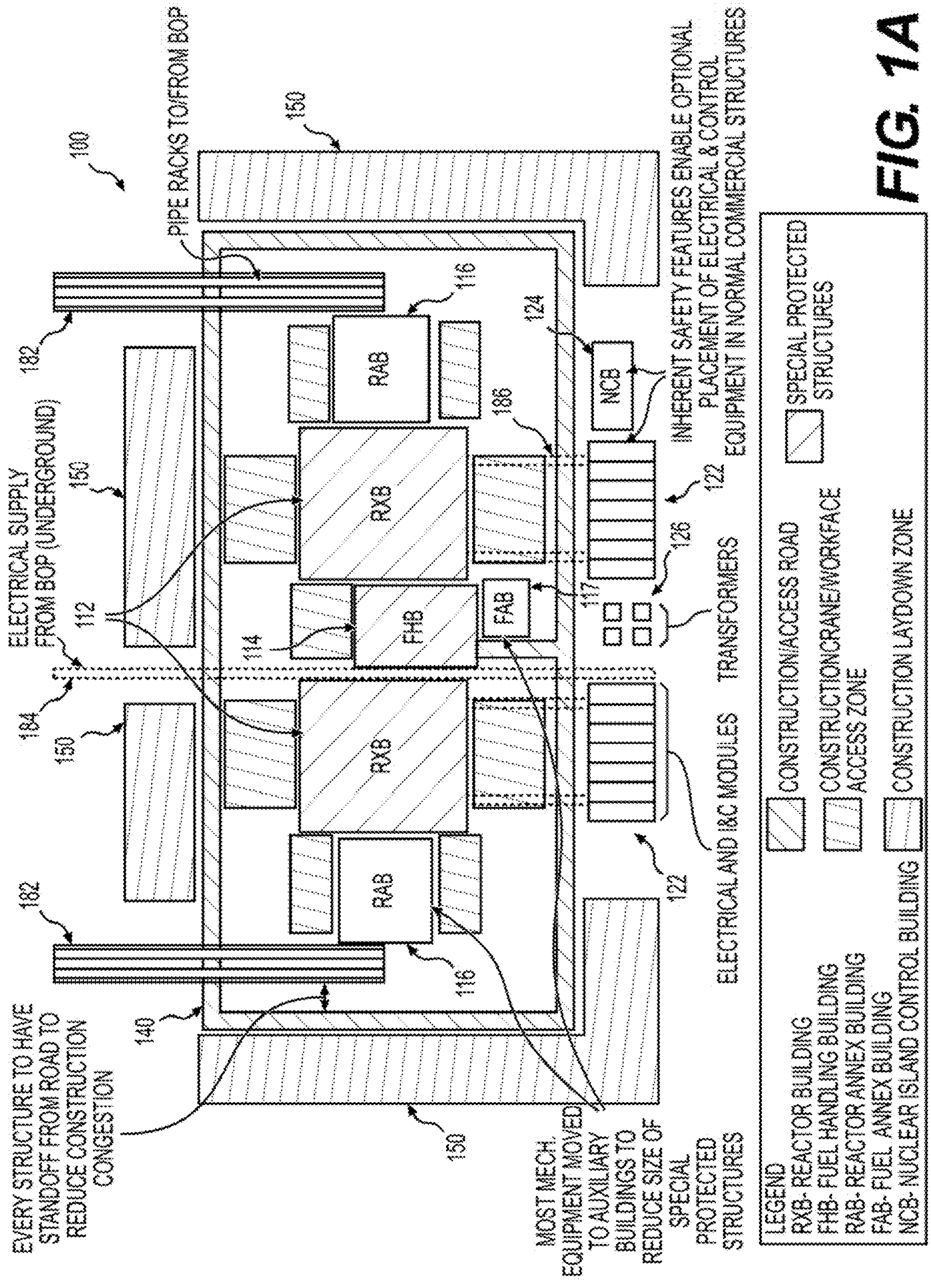
FIGS. 1A and 1B are plan schematic views of a nuclear power plant having a distributed modular nuclear power plant layout, according to some example embodiments.

It should be understood that when an element or layer is referred to as being "on," "connected to," "coupled to," or "covering" another element or layer, it may be directly on, connected to, coupled to, or covering the other element or layer or intervening elements or layers may be present. In contrast, when an element is referred to as being "directly on," "directly connected to," or "directly coupled to" another element or layer, there are no intervening elements or layers present. Like numbers refer to like elements throughout the specification. As used herein, the term "and/or" includes any and all combinations of one or more of the associated listed items.

It should be understood that, although the terms first, second, third, etc. may be used herein to describe various elements, components, regions, layers and/or sections, these elements, components, regions, layers, and/or sections should not be limited by these terms. These terms are only used to distinguish one element, component, region, layer, or section from another region, layer, or section. Thus, a first element, component, region, layer, or section discussed below could be termed a second element, component, region, layer, or section without departing from the teachings of example embodiments.

Spatially relative terms (e.g., "beneath," "below," "lower," "above," "upper," and the like) may be used herein for ease of description to describe one element or feature's relationship to another element(s) or feature(s) as illustrated in the figures. It should be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" may encompass both an orientation of above and below. The device may be otherwise oriented (rotated 90 degrees or at other orientations) and the spatially relative descriptors used herein interpreted accordingly.

The terminology used herein is for the purpose of describing various embodiments only and is not intended to be limiting of example embodiments. As used herein, the singular forms "a," "an," and "the" are intended to include the plural forms as well, unless the context clearly indicates otherwise. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

Example embodiments are described herein with reference to cross-sectional illustrations that are schematic illustrations of idealized embodiments (and intermediate structures) of example embodiments. As such, variations from the shapes of the illustrations as a result, for example, of manufacturing techniques and/or tolerances, are to be expected. Thus, example embodiments should not be construed as limited to the shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of example embodiments.

Unless otherwise defined, all terms (including technical and scientific terms) used herein have the same meaning as commonly understood by one of ordinary skill in the art to which example embodiments belong. It will be further understood that terms, including those defined in commonly used dictionaries, should be interpreted as having a meaning that is consistent with their meaning in the context of the relevant art and will not be interpreted in an idealized or overly formal sense unless expressly so defined herein.

Although described with reference to specific examples and drawings, modifications, additions and substitutions of example embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

When the terms "about" or "substantially" are used in this specification in connection with a numerical value, it is intended that the associated numerical value include a tolerance of ±10% around the stated numerical value. When ranges are specified, the range includes all values therebetween such as increments of 0.1%.

Distributed Modular Layout Architecture

Some example embodiments relate to nuclear power plants having a distributed modular nuclear power plant layout architecture and which are not laid out according to a monolithic modular approach. More distributed modular building architectures may be faster and less costly to construct than a monolithic modular approach, despite some increases in total commodities. The main driver for the cost reduction is the layout is specifically designed to enable a faster construction schedule (e.g., quicker construction of the plant) and lower overall labor costs and, because construction labor costs, the time value of money and interest during construction typically dominate more than costs associated with commodity volumes (e.g., concrete volume, reinforcing steel tonnage, length of installed pipe, length of installed cable, etc.).

In some example embodiments, nuclear power plants having a distributed modular nuclear power plant layout architecture include structures that are spaced further apart from each other, i.e., "distributed". For example, a nuclear power plant having a distributed modular nuclear power plant layout architecture may include structures that are spaced at least 5 meters apart, at least 10 meters apart, at least 15 meters apart, and/or at least 20 meters apart.

Spacing between structures facilitates labor and material flow during construction. Extra space provides greater flexibility in material laydown. Materials and components can be stored closer to where they are used. More access roads enables near proximity ground delivery of large components which then can be installed by smaller capacity cranes because their reach is smaller which is also facilitated by the relatively narrow structures. Finally, more access creates more work faces leading to greater parallel work which is perhaps the strongest schedule accelerator to reduce time for construction of the nuclear power plant. A work face is defined as an area where construction takes place simultaneous with other construction on the site. For example, in designs with many floors, upper floors must wait to start construction until signification installation of mechanical equipment is complete on lower floors. A similar problem arises for buildings which are very wide and highly compartmentalized where the innermost rooms must be completed first versus a design with adjacent rooms accessible simultaneously from the side. These examples are pervasive in monolithic designs and significantly less with distributed designs.

In some example embodiments, the nuclear reactor (e.g., nuclear reactor vessel) and auxiliary nuclear support systems are placed in one or more "special protected structures" (also referred to herein as simply "protected structures") to guard against loss of fundamental safety functions that are at least initiated by the auxiliary nuclear support systems due to damaging events.

Damaging events, which may originate externally to one or more protected structures of the nuclear power plant, may be associated with one or more portions of the nuclear power plant incurring damage. Damaging events, which may also be referred to as "damaging design events," "design damaging events," "damaging design level events," "design damaging level events," or the like with regard to configurations (including designs) of one or more structures of a nuclear power plant, may include external events ("design external events") and/or certain internal events ("design internal events"). External events include seismic events, also referred to herein as design seismic events (e.g., earthquakes), weather events, also referred to herein as design weather events (e.g., a design extreme wind and flooding event, including tornadoes, floods, etc.) malevolent acts, also referred to herein as design malevolent acts, on the nuclear power plant, including attacks on the nuclear power plant (e.g., terrorist attacks), etc. that originate and/or are occurring within a particular proximity range of at least a portion of the nuclear power plant (e.g., a nuclear structure that includes at least one of the nuclear reactor or nuclear fuel storage). Said particular proximity range may be, for example, 1 km, 2 km, 5 km, 10 km, 20 km, 50 km, or the like. The certain internal events (e.g., design internal events) may include fires within the nuclear power plant, malfunctions and/or failures of one or more certain pieces of equipment in the nuclear power plant, etc.

It will be understood that, as described herein, an event (e.g., damaging event) as described herein may be a design event (e.g., a design damaging event) that may be defined in accordance with regulatory guidance, standards, and/or statutes, including for example any regulatory guidance or standards as described herein or the like.

In some example embodiments, a damaging event (e.g., damaging design event) may include a damaging external low-probability and high-magnitude design event includes at least one of a design seismic event (e.g., "seismic event") defined in accordance with ASCE/SEI 43-19 or other relevant regulatory guidance, a design extreme wind and flooding event (e.g., "weather event," "design weather event," etc.) defined in accordance with US NRC Regulatory Guide (RG) 1.76 or other relevant regulatory guidance, a design malevolent act (e.g., attack, terrorist attack, etc.) on the nuclear power plant defined in accordance with relevant regulatory guidance, and/or a fire within a particular proximity range (e.g., within 1 km, 2 km, 5 km, 10 km, 20 km, 50 km, etc.) of the nuclear structure defined in accordance with relevant regulatory guidance.

Separation of Disciplines

Referring to FIGS. 1A-3B, in some example embodiments, nuclear power plants having a distributed modular nuclear power plant layout architecture also incorporate a physical "separation of disciplines" practice into their layout design. The order of construction/installation by discipline, regardless of whether the "distributed" or "monolithic" layout approach is used, is typically in the order of 1) civil, 2) structural, 3) mechanical, 4) electrical and finally 5) controls. In the "distributed" approach, to facilitate a faster construction schedule, most of the mechanical scope is locationally separated from most of the electrical and controls scope into plant areas (i.e., mechanical equipment grouped locationally separate from electrical equipment).

Most mechanical scope (e.g., mechanical equipment), in a nuclear power plant, refers typically to reactor vessels, fuel storage pools, other vessels, tanks, pumps, fans, compressors, heat exchangers, valves, pipes, etc., while electrical/controls scope, in a nuclear power plant, may include plant electrical and controls equipment, including control cabinets, switchgear, unit substations, motor control centers, protective relays, battery systems, uninterruptible power supplies, inverters, etc. The separation may be implemented to reduce the construction schedule. It enables prioritization of the civil and structural scope associated with the larger critical path drivers which is typically mechanical components.

Meanwhile, the vast majority of plant electrical and controls equipment, associated with the electrical and controls disciplines, may be consolidated in a few locations or a single location at a distance from the bulk of the mechanical scope. Since electrical and controls equipment are typically installed after the mechanical equipment during the construction of a nuclear power plant, separating this equipment allows for more parallel construction work to construct the nuclear power plant (e.g., the electrical/controls equipment may be constructed/installed at least partially concurrently with the construction/installation of the mechanical equipment).

As a result, and as shown in at least FIGS. 1A-3B, a nuclear power plant 100 having a distributed modular nuclear power plant layout architecture may include a first cluster 110 of structures associated with mechanical equipment (e.g., "most mechanical scope"), the first cluster 110 including, for example a nuclear structure (e.g., the nuclear reactor building (RXB) 112, fuel handling building (FHB) 114, reactor annex building (RAB) 116, and/or fuel annex building (FAB) 117), and a second cluster 120 of structures (e.g., Electrical and I&C modules (e-room modules) 122, nuclear island control building (NCB) 124 which may be included in a modular control room and/or an e-room module, and/or transformers 126) associated with electrical equipment, instrumentation equipment, control equipment, and/or communication equipment (e.g., "most electrical & control scope"). Said second cluster 120 may include one or more support structures as described herein, which may include one or more initiation support equipment. A majority of mechanical equipment of the nuclear power plant may be located within the first cluster 110 of structures (e.g., the "most mechanical scope" structures as shown in FIG. 1B) and a majority of electrical equipment, instrumentation equipment, control equipment, and/or communication equipment of the nuclear power plant may be located within the second cluster 120 of structures (e.g., the "most electrical & control scope" structures as shown in FIG. 1B). As shown in FIG. 1B, the first and second clusters 110 and 120 may be spatially separate from each other such that a smallest distance between a structure of the first cluster 110 and a structure of the second cluster 120 (e.g., distance 138 as shown in FIG. 1B) is greater than both a first average distance between adjacent structures of the first cluster 110 (e.g., distance 118 as shown in FIG. 1B) and a second average distance 128 between adjacent structures of the second cluster 120 (e.g., distance 128 as shown in FIG. 1B). Said smallest distance may be, for example, at least 5 meters. As shown in FIGS. 1A-1B, one or more structures/buildings of the first and second clusters 110 and 120 may be connected to pipe racks 182 from the balance of the plant (BOP) and/or electrical supply from the BOP (underground) 184. As shown, electrical supply (underground) 186 may extend between and electrically connect different structures/buildings of the nuclear power plant 100, including different structures/buildings of different scopes (e.g., mechanical or electrical/control scopes) and thus extend between and electrically connect different structures/buildings of different clusters 110 and/or 120.

In some example embodiments, at least 80% of all mechanical equipment of the nuclear power plant 100 is located within the first cluster 110 of structures and at least 80% of electrical equipment, instrumentation equipment, control equipment, and/or communication equipment of the nuclear power plant 100 is located within the second cluster 120 of structures.

In some example embodiments, a nuclear power plant 100 may include various quantities of clusters of structures associated with various equipment. A nuclear power plant 100 may include one or more first clusters 110 of structures associated with mechanical equipment and one or more second clusters 120 of structures associated with electrical equipment, instrumentation equipment, control equipment, and/or communication equipment, where the one or more first clusters 110 of structures associated with mechanical equipment are spatially separated from the one or more second clusters 120 of structures associated with electrical equipment, instrumentation equipment, control equipment, and/or communication equipment. For example, a nuclear power plant 100 may include one first cluster 110 of structures associated with mechanical equipment and three second clusters 120 of structures, associated with electrical/control equipment, which are spatially separated from (e.g., at least 5 meters separated from) the one first cluster 110 of structures. In another example, a nuclear power plant 100 may include two first clusters 110 of structures associated with mechanical equipment and one second cluster 120 of structures, associated with electrical/control equipment, which is spatially separated from (e.g., at least 5 meters separated from) the two first clusters 110 of structures.

As shown in at least FIG. 3B, the first and/or second clusters 110 and/or 120 may each include one or more protected structures (e.g., structures categorized as SDC-5 and SDC-3, as described further below) and/or one or more non-protected structures (e.g., structures categorized as SDC-1 and SDC-2, as described further below).

In some example embodiments, the first and second clusters of structures 110 and 120 are structurally independent (e.g., spatially separate) from each other such that a structure of the second cluster 120 is configured and designed to prevent adverse interaction with a structure of the first cluster 110 during a design event that can affect the integrity and safety function of the first-cluster structures 110 and equipment that they host, support and protect (e.g., a damaging event).

Figure 2:
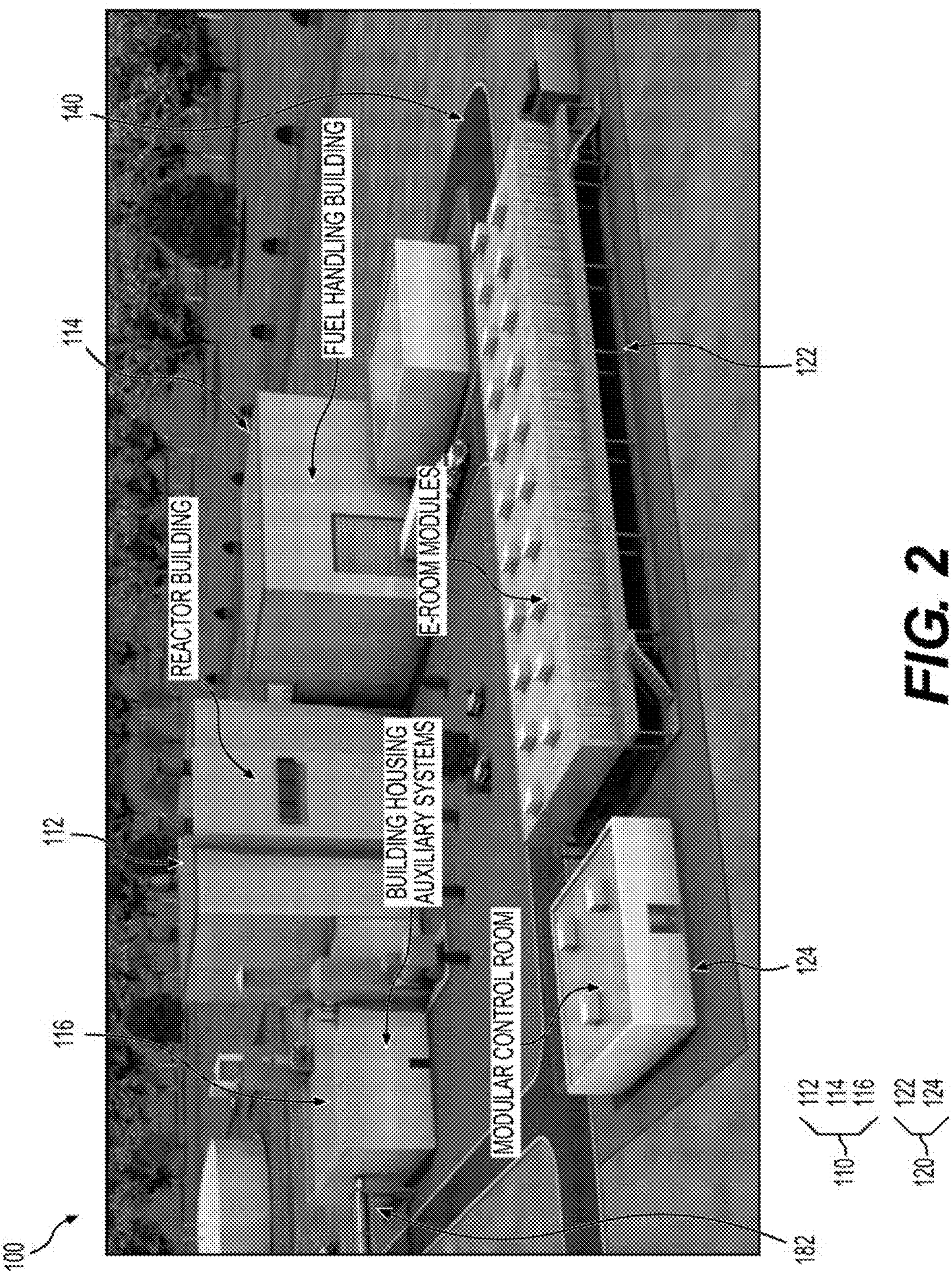
FIG. 2 is a perspective rendered view of a nuclear power plant having a distributed modular nuclear power plant layout, specifically showing modular electrical and control structures, according to some example embodiments.

As shown in FIG. 2, in some example embodiments, to facilitate even faster construction, these electrical and controls equipment may be incorporated into modular electrical equipment houses "E-Room" at an offsite factory. These E-Rooms 122, also referred to herein as e-room buildings, e-room modules, or the like, contain items such as control cabinets, switchgear, unit substations, motor control centers, protective relays, battery systems, uninterruptible power supplies, inverters, etc. The modular buildings may be road or rail shippable. The factory assembled modules may arrive onsite with most of the equipment already tested. This accelerates plant commissioning. Upon delivery of the factory assembled modules to the construction site, construction may comprise mechanically fastening the modules (e.g., via bolts) to a concrete slab and re-landing electrical interconnections (i.e., cabling from the mechanical scope area is linked to the electrical and control equipment within the electrical scope area).

Distributed Structures

Traditional nuclear power plants were discouraged from pursuing a distributed modular architecture because nuclear support systems providing fundamental safety functions (e.g., support equipment) extended far beyond the nuclear reactor vessel or fuel storage area. For example, a nuclear power plant may include support equipment configured to provide coolant inventory control in the event of pipeline breaks to mitigate loss of coolant accidents. This coolant inventory control typically requires DC power and associated controls and human machine interface to control a valve at a minimum. These systems, structures and components were relied upon to perform fundamental safety functions long after a damaging event caused shutdown of the nuclear reactor therefore drove a requirement that these systems, structures and components be placed in "special protected structures." Special protected structures, also referred to herein interchangeably as "protected structures," are designed and constructed ("configured") to meet ("comply with") more stringent nuclear codes and standards such as, but not limited to, ASME BPVC, ACI 349, ANSI/AISC N690, etc., to ensure a much higher probability that the structure and therefore the systems and components inside will survive an event to satisfy fundamental safety functions. Countries outside the U.S. use equivalent codes.

In some example embodiments, a nuclear power plant having a distributed modular nuclear power plant layout architecture may have multiple distributed structures, wherein at least one such structure (e.g., a nuclear structure that includes at least one of a nuclear reactor or a nuclear fuel storage) is a protected structure, and wherein another such structure, which may be a support structure including at least some support equipment configured to cause one or more fundamental safety functions to be performed, may be a protected structure or a non-protected structure.

As described herein, a protected structure may include structural features that configure the protected structure to meet (e.g., comply with) one or more particular nuclear safety requirements associated with protecting against damage to a nuclear reactor, damage to nuclear fuel, release of radioactive material, or the like due to the occurrence of a damaging event.

In some example embodiments, a "particular nuclear safety requirement" may include one or more design criteria, including for example, Seismic Design Criteria defined by American National Standards Institute (ANSI)/American Nuclear Society (ANS) 2.26-2004, *Categorization of Nuclear Facility Structures, Systems, and Components for Seismic Design*, also referred to herein as ANSI/ANS-2.26-2004, DOE-Standard (STD) 1189-2008, ASCE/SEI 43-19, NRC Regulatory Guide 1.29, governing nuclear codes and standards such as ASME BPVC, ACI 349, ANSI/AISC N690, or the like. For example, ANSI/ANS-2.26-2004 may indicate various SDCs that may each define a Seismic Design Basis (SDB) for a structure of the nuclear power plant. SDCs may range from SDC-1 to SDC-5. A protected structure that meets a particular nuclear safety requirement may, for example, be configured to meet (e.g., satisfy) a Seismic Design Category that is at least one of SDC-3, SDC-4, or SDC-5 as defined by ANSI/ANS-2.26-2004 and/or ASCE/SEI 43-19.

In another example, a "particular nuclear safety requirement" may include one or more design criteria associated with various natural disasters, including tornadoes, floods, hurricanes, fires, or the like. For example, a "particular nuclear safety requirement" may include one or more design criteria associated with and/or included in at least one of General Design Criterion (GDC) 2, "Design Bases for Protection Against Natural Phenomena," of Appendix A, "General Design Criteria for Nuclear Power Plants," to Title 10, Part 50, of the Code of Federal Regulations (10 CFR Part 50), "Domestic Licensing of Production and Utilization Facilities," GDC 4, "Environmental and Dynamic Effects Design Bases," of Appendix A to 10 CFR Part 50, 10 CFR Part 100, NRC Regulatory Guide 1.76 "Design-Basis Tornado And Tornado Missiles For Nuclear Power Plants," ANSI/ANS-2.8-2019, "Probabilistic Evaluation of External Flood Hazards for Nuclear Facilities," or the like, and a protected structure that meets a particular nuclear safety requirement may, for example, be configured to meet one or more of any of said design criteria associated with and/or included in any of same.

In some example embodiments, a "particular nuclear safety requirement" may include one or more stringent nuclear standards to give a much higher probability that a protected structure that meets the particular nuclear safety requirement, and therefore the systems and components inside (e.g., nuclear reactor, nuclear fuel, auxiliary nuclear support systems within the structure, etc.), will survive a damaging event, thereby enabling said auxiliary nuclear support systems to successfully perform (e.g., "satisfy") one or more fundamental safety functions. It will be understood that the "particular nuclear safety requirement" is not limited to the standards and codes listed above, as countries outside the U.S. may use equivalent codes that may meet the particular nuclear safety requirement.

In some example embodiments, a protected structure may be structurally distinguished by being supported by a nuclear island basemat structure, also referred to herein simply as a "basemat," such that said nuclear island basemat structure may be one or more features of the special protected structure that at least partially configures the special protected structure to meet the particular nuclear safety requirement. A nuclear island basemat structure may include a reinforced concrete foundation (e.g., about 6 feet in thickness) and may be structurally configured to ensure that the equipment within the protected structure (e.g., a nuclear reactor, nuclear fuel storage, etc.) continues to satisfy fundamental safety functions even during and after the occurrence of a damaging event (e.g., a seismic event such as an earthquake). In some example embodiments, a non-protected structure may be supported on a simple concrete slab structure, or no slab at all (e.g., supported on bare soil or rock material).

In some example embodiments, a nuclear structure may be understood to be a structure hosting, supporting and protecting equipment, systems and components including at least one of a nuclear reactor or a nuclear fuel storage, which damage during and after an event (e.g., external and/or internal design events) can have significant adverse consequences on the environment and the public as defined by ANSI/ANS-2.26-2004 designed in accordance with the governing nuclear codes and standards such as ASME BPVC, ACI 349 and ANSI/AISC N690.

In some example embodiments, by placing auxiliary nuclear safety systems in the same building as the nuclear reactor, or an adjacent auxiliary building of equivalent nuclear quality (e.g., another protected structure which may or may not share a basemat with the nuclear reactor building), the total commodities (e.g., concrete volume, reinforcing steel tonnage, length of installed pipe, length of installed cable, etc.) for a specific nuclear power plant may be reduced vs. having multiple distributed "special protected structures." Most internal events (e.g., inadvertent valve closure, loss of power bus, etc.) may not require protected structures because such events are not typically associated with protecting systems and components from outside forces by dependency on the structure to provide this protection. The term "nuclear quality" is used to generically refer to activities that are held to a much more stringent quality assurance level such as that governed by 10 CFR Part 50 appendix B in the U.S. or equivalent in other countries.

As described herein, buildings in a nuclear power plant that are not protected structures may be referred to herein as "non-protected structures."

As described herein, a nuclear power plant 100 may include a nuclear reactor building (RXB) 112 (e.g., reactor containment building) and fuel handling building (FHB) 114 (also referred to herein as a fuel storage facility) which are part of a single protected structure or are located in separate, respective protected structures. Such one or more structures may be referred to herein as "nuclear structures." For example, a nuclear power plant 100 may include a nuclear structure, the nuclear structure including at least one of a nuclear reactor or a nuclear fuel storage, the nuclear structure being a protected structure configured to protect the at least one of the nuclear reactor or the nuclear fuel storage from incurring damage due to a damaging event, the damaging event originating externally to the protected structure, the damaging event associated with damage being incurred by at least a portion of the nuclear power plant.

In some example embodiments, a nuclear power plant 100 may include one or more "auxiliary" buildings that are protected structures and which are adjacent (e.g., directly adjacent to or within a certain proximity, e.g., within 5 meters) to the protected structure(s) that are/define the nuclear reactor building and/or fuel storage building but may or may not share a same basemat with the special protected structure(s) that are/define the nuclear reactor building (RXB) 112 and/or fuel storage building (e.g., fuel handling building (FHB) 114). For example, an auxiliary building of the nuclear power plant (e.g., an auxiliary building containing safety related residual heat removal systems) may include a separate basemat than the nuclear reactor building. Accordingly, the one or more auxiliary buildings of the nuclear power plant may be understood to be "seismically decoupled" from the protected structure(s) that are/define the nuclear reactor building and/or fuel storage building, wherein seismically decoupled structures are spaced apart so that the structures are configured to not interact with each other in response to a seismic event (e.g., earthquake). In some example embodiments, the seismically-decoupled auxiliary building(s) may be configured to meet a similar or same nuclear safety requirement (e.g., seismic standard) as said special protected structure(s) that are/define the nuclear reactor building and/or fuel storage building.

The nuclear power plant 100 may include one or more "annex" buildings (e.g., annex structures, such as reactor annex building (RAB) 116 and/or fuel annex building (FAB) 117) which are immediately adjacent to (e.g., within 5 meters proximity) a protected structure of the nuclear power plant. The annex building(s) may be physically separated (e.g., isolated) from the basemat of the special protected structure(s) that are/define the nuclear reactor building and/or fuel storage building and thus may be understood to be seismically decoupled from same. As such, the annex buildings may be configured to meet different seismic standards than the protected structures, and thus may not meet the same nuclear safety requirement that is met by the protected structures. An annex structure may not be a protected structure (e.g., may be a non-protected structure) and thus may not be configured to protect equipment located within the annex structure from incurring damage due to a damaging event. For example, where a protected structure of the nuclear power plant is configured to meet at least one of SDC-3, SDC-4, or SDC-5 as defined by ANSI/ANS-2.26-2004 and/or ASCE/SEI 43-19, an annex building of the nuclear power plant may not be configured to meet some or any of SDC-3, SDC-4, or SDC-5. For example, an annex building of the nuclear power plant may be configured to meet at least one of Non-Seismic, SDC-1, or SDC-2 as defined by ANSI/ANS-2.26-2004, and/or ASCE/SEI 43-19 and to not meet any of SDC-3, SDC-4, or SDC-5 as defined by ANSI/ANS-2.26-2004 and/or ASCE/SEI 43-19.

The nuclear power plant may include one or more "satellite" buildings (also referred to herein as satellite structures) which are protected structures but are not immediately adjacent to (e.g., more than 6 meters distance from, more than 12 meters distance from, etc.) the nuclear reactor building and/or fuel storage building.

The nuclear power plant may include one or more "support" buildings (also referred to herein as support structures) that are spatially separate from a protected structure of the nuclear power plant. A support structure may, in some example embodiments, be significantly distant from (e.g., more than 6 meters distance from, more than 12 meters distance from, etc.) a "protected structure" that a nuclear structure (e.g., nuclear reactor building and/or fuel handling building). The support structure(s) may be physically separated (e.g., isolated) from the basemat of the protected structure(s) that are/define the nuclear reactor building and/or fuel storage building and thus may be understood to be seismically decoupled from same. As such, the support structures may be configured to meet different seismic standards than the protected structures, and thus may not meet the same nuclear safety requirement that is met by the protected structures. A support structure may not be a protected structure (e.g., may be a non-protected structure) and thus may not be configured to protect equipment located within the support structure from incurring damage due to a damaging event. For example, where a protected structure of the nuclear power plant is configured to meet at least one of SDC-3, SDC-4, or SDC-5 as defined by ANSI/ANS-2.26-2004, and/or ASCE/SEI 43-19, a support structure of the nuclear power plant may not be configured to meet some or any of SDC-3, SDC-4, or SDC-5. For example, a support structure of the nuclear power plant may be configured to meet at least one of Non-Seismic, SDC-1, or SDC-2 as defined by ANSI/ANS-2.26-2004, and/or ASCE/SEI 43-19 and to not meet any of SDC-3, SDC-4, or SDC-5 as defined by ANSI/ANS-2.26-2004 and/or ASCE/SEI 43-19.

As described herein, a "spatially separate structure" may refer to any of the "satellite" and/or "support" structures of a nuclear power plant having a distributed modular nuclear power plant layout architecture.

In some example embodiments, a non-protected structure of the nuclear power plant (e.g., a support structure, an annex structure, or a combination thereof) may be a structure that is designed in accordance with (e.g., is configured to meet) one or more various non-nuclear industry codes, including IBC, ACI 318, AISC 360, some combination thereof, or the like.

In some example embodiments, a structure that is configured with regard to a damaging event (e.g., configured to protect equipment located within from incurring damage due to the damaging event) may be understood to be designed with regard to the damaging event (e.g., designed to protect equipment therein from incurring damage due to the damaging event). For example, a support structure that is not configured to protect initiating support equipment located within from incurring damage due to a damaging event (e.g., damaging design event) may be not designed to protect the initiating support equipment located within from incurring damage due to the damaging event (e.g., damaging design event).

Construction Operations

In some example embodiments, a nuclear power plant having a distributed modular nuclear power plant layout architecture wherein at least some auxiliary safety systems are distributed into separate structures may have reduced construction costs in relation to nuclear plants having large monolithic modular structures that incorporate almost all said auxiliary safety systems and the nuclear reactor in a same structure, despite realized reduction in installed commodity counts. The monolithic approach to "protected structures" may result in few work faces because the sprawl of equipment requiring protection by the monolithic modular structure drives the need for multiple floors and rooms within the monolithic modular structure, resulting in more sequential rather than parallel work during construction of the nuclear power plant. A work face is defined as an area where construction takes place simultaneous with other construction on the site. For example, crane access to portions of the nuclear reactor building that is a large monolithic modular structure during construction is limited because the large footprint of a large monolithic modular structure drives the use of longer-reach cranes, and therefore typically fewer cranes during construction. In another example, worker productivity during construction of a nuclear power plant having a monolithic modular structure may be lower than during construction of a nuclear power plant having a distributed modular layout architecture due to congestion and the large scope of on-site nuclear quality assurance (construction activities on-site governed under 10 CFR Part 50 appendix B in the U.S. or equivalent in other countries) associated with interdependent safety related equipment within the large monolithic modular structure, thereby extending the construction timeline. Furthermore, most traditional light water reactors use a pressure retaining containment structure having a volume that is much larger than the nuclear reactor vessel of the nuclear reactor itself. This specific containment structure design further expands the footprint of the nuclear reactor building that is a large monolithic modular structure, exacerbating the cost of the nuclear power plant and extending the timeline of construction of same.

Figure 8A:
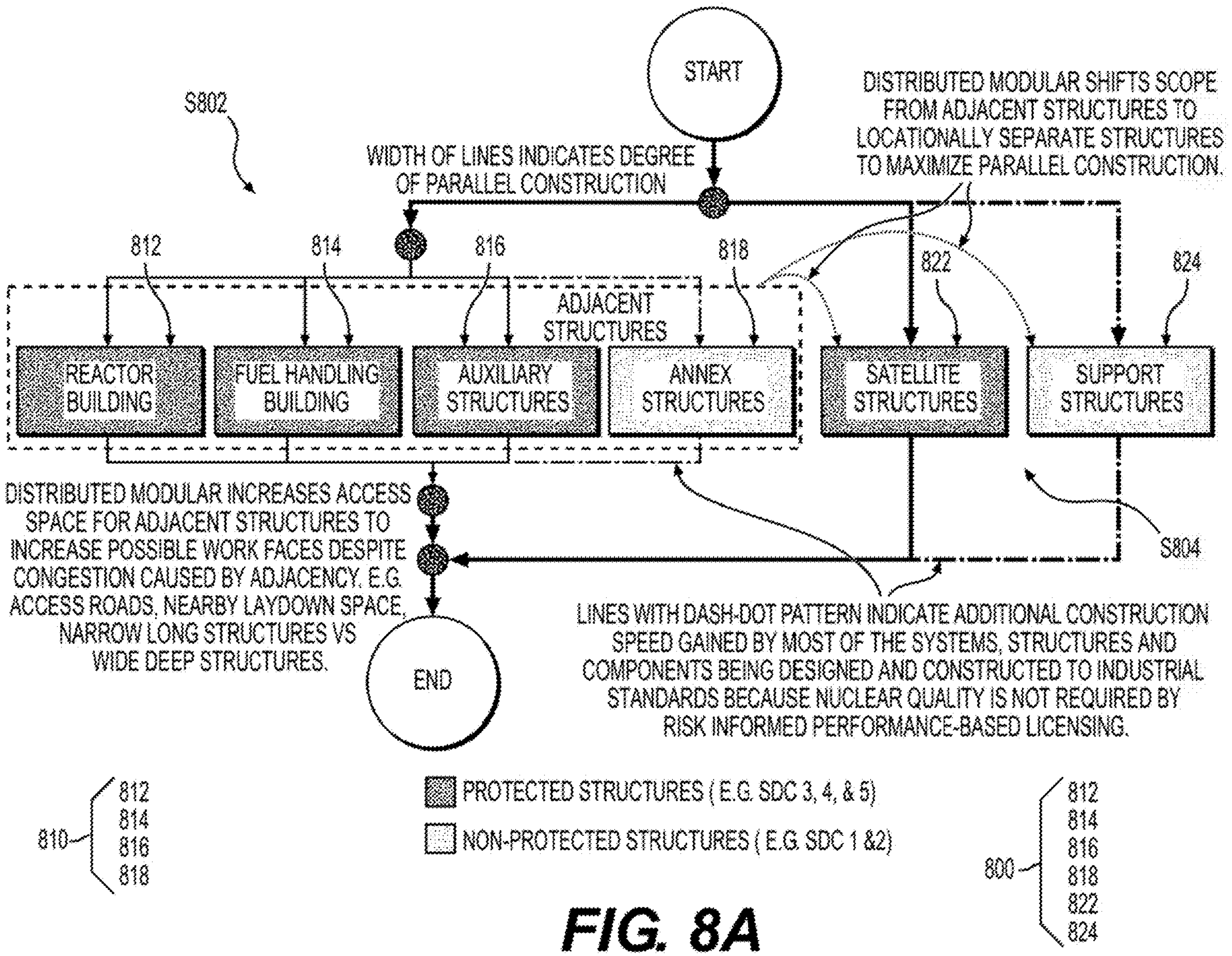
FIG. 8A is a flowchart illustrating a method of construction of a nuclear power plant having a distributed modular layout architecture, according to some example embodiments.

Referring to FIG. 8A, a method for constructing a nuclear power plant 800 having a distributed modular nuclear power plant layout architecture may include, at S802, constructing adjacent structures 810 (e.g., a nuclear reactor building 812 and/or fuel handling building 814, which may be referred to as one or more nuclear structures) with a high degree of parallel construction with satellite and support (S804) structures 822 and 824, where the adjacent structures and the satellite and support structures 822 and 824 (e.g., spatially separate structures) are constructed at least partially concurrently based at least in part upon said structures being spaced apart ("distributed"). The adjacent structures 810 constructed at S802 may include at least one of a nuclear reactor or a nuclear fuel storage (e.g., may be a nuclear reactor building 812 and/or fuel handling building 814) and/or may be an auxiliary building 816 (where the nuclear reactor building 812, fuel handling building 814, and/or auxiliary building 816 may be referred to herein as a nuclear structure) and may be a protected structure configured to protect the at least one of the nuclear reactor or the nuclear fuel storage from incurring damage due to an occurrence of a damaging event, the damaging event originating externally to the protected structure, the damaging event causing damage to be incurred by at least a portion of the nuclear power plant. The protected structure (e.g., nuclear structure) may host, support and protect equipment, systems and components including at least one of a nuclear reactor or a nuclear fuel storage, which damage during and after an event (e.g., external or internal accident design events, damaging design events, etc.) can have significant adverse consequences on the environment and the public as defined by ANSI/ANS-2.26-2004. The support structure 824 may be spatially separate from the protected structure and may be constructed to include an initiating support equipment, the initiating support equipment configured to trigger a frontline support equipment to perform a fundamental safety function such that the fundamental safety function is performed independently of the initiating support equipment subsequent to the triggering, the fundamental safety function including at least one of controlling a reactivity of the nuclear reactor, cooling a reactor radioactive material in the nuclear reactor, cooling a stored radioactive material in the nuclear fuel storage, or confining a particular radioactive material within an enclosure of a container to suppress a release of the particular radioactive material from the container (e.g., to the environment or the public). In some example embodiments, a structure constructed at S804 is a non-protected structure (i.e., support structure 824) that is not configured to protect the initiating support equipment from incurring damage due to the occurrence of the damaging event. Such a non-protected structure may be designed in accordance with (e.g., configured to meet) one or more non-nuclear industry codes including IBC, ACI 318, and/or AISC 360. The frontline support equipment may be installed within the nuclear structure and/or the support structure. The constructing of protected structures may include constructing the structures to meet (e.g., meet requirements for) a first seismic design category (e.g., first-tier seismic design category (SDC)) that is at least one of SDC-3, SDC-4, or SDC-5 according to ANSI/ANS-2.26-2004 and/or ASCE/SEI 43-19. The constructing of non-protected structures may include constructing the structures to meet (e.g., meet requirements for) a second seismic design category (e.g., second-tier SDC) that may be at least one of Non-Seismic, SDC-1, or SDC-2 according to ANSI/ANS-2.26-2004 and/or ASCE/SEI 43-19.

The constructing of non-protected structures may include constructing the structures to meet the second seismic design category that is a combination of SDC-1 or SDC-2 according to ANSI/ANS-2.26-2004.

Also, in FIG. 8A, a satellite structure 822, which is a protected structure, may be spatially separate from other protected structures (e.g., buildings 812, 814, and 816) and may be constructed to include an initiating support equipment, the initiating support equipment within the satellite structure 822 being configured to trigger a frontline support equipment to perform a fundamental safety function such that the fundamental safety function is performed dependently of the initiating support equipment located within the satellite structure 822 subsequent to the triggering, the fundamental safety function including at least one of controlling a reactivity of the nuclear reactor (e.g., in the nuclear reactor building 812), cooling a reactor radioactive material in the nuclear reactor, cooling a stored radioactive material in the nuclear fuel storage (e.g., in the fuel handling building 814), or confining a particular radioactive material within an enclosure of a container to suppress a release of the particular radioactive material from the container (e.g., to the environment or the public).

Figure 8B:
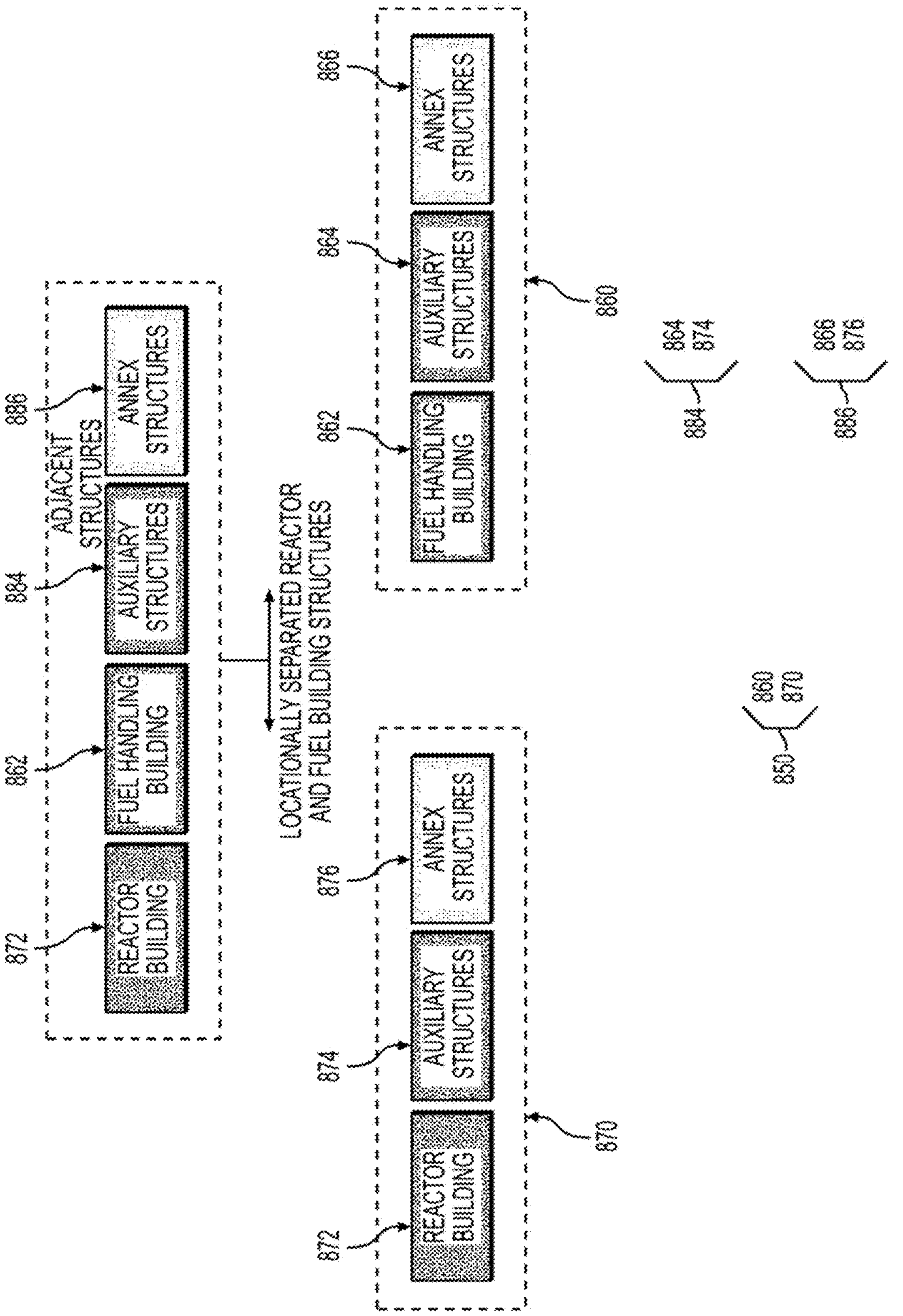
FIG. 8B is a schematic illustrating a nuclear power plant having a distributed modular layout architecture, according to some example embodiments.

In some example embodiments, and as shown in FIG. 8B, a nuclear power plant 850 having a distributed modular nuclear power plant layout architecture may include structures (e.g., a first set of adjacent structures 860) associated with the fuel handling (e.g., a fuel handling building 862 containing a nuclear fuel storage and auxiliary and annex structures 864 and 866 associated therewith) that are spatially separated (e.g., at least 6 meters separate, at least 12 meters separate, etc.) from the structures (e.g., a second set of adjacent structures 870) associated with the reactor (e.g., a nuclear reactor building 872 and auxiliary and annex structures 874 and 876 associated therewith). This may be done to further increase the degree of parallel construction and also facilitate sharing of the fuel handling building 862 with several other reactors. Adjacent structures (e.g., the structures of the first set of adjacent structures 860 and/or the structures of the second set of adjacent structures 870) may be less than 6 meters apart from each other, including being less than 5 meters apart, less than 4 meters apart, less than 3 meters apart, less than 2 meters apart, less than 1 meter apart, etc.

The auxiliary structures associated with the nuclear reactor or the nuclear fuel storage (e.g., auxiliary structures 864 and/or 874, collectively auxiliary structures 884) may be auxiliary structures as described herein (e.g., protected structures adjacent to the nuclear reactor building 872 or fuel handling building 862). The annex structures associated with the nuclear reactor or the nuclear fuel storage (e.g., annex structures 866 and/or 866, collectively annex structures 886) may be annex structures as described herein (e.g., non-protected structures adjacent to the nuclear reactor building 872 or fuel handling building 862).

Structures associated with the nuclear fuel storage may include (e.g., contain) equipment configured to support operations and/or functions (e.g., fundamental safety functions) of the nuclear fuel storage. Such equipment may include, for example, heat transport systems (e.g., heat exchangers, conduits, pipes, etc.) that transport heat to and/or from the nuclear fuel storage, fuel pool cleanup equipment, standby power supplies, control equipment, coolant cleanup equipment, emergency pool cooling systems, residual heat removal systems, emergency power supplies, any combination thereof, or the like.

Structures associated with the nuclear reactor may include (e.g., contain) equipment configured to support operations and/or functions (e.g., fundamental safety functions) of the nuclear reactor. Such equipment may include, for example, heat transport systems (e.g., heat exchangers, conduits, pipes, etc.) that transport heat (e.g., steam, molten salt, sodium, gas, etc.) to and/or from the nuclear reactor (e.g., to perform useful work (e.g., generate electricity or heat a chemical process)), standby power supplies, control equipment, coolant cleanup equipment, emergency core cooling systems, residual heat removal systems, emergency power supplies, any combination thereof, or the like.

Fundamental Safety Functions and Support Equipment

Referring to FIGS. 1A-7, in some example embodiments, a nuclear power plant having a distributed modular nuclear power plant layout architecture may include support equipment configured to enable fundamental safety functions to be performed/satisfied.

As described herein, "fundamental safety functions" may include functions that, when successfully performed (e.g., satisfied), achieve at least one of: 1) controlling a reactivity of the nuclear reactor (e.g., safely shutting down the nuclear reactor and maintaining the nuclear reactor in a safe shutdown condition (including a zero power critical or subcritical state) during and after a damaging event), 2) cooling (e.g., removing residual heat from) a reactor radioactive material in the nuclear reactor (e.g., after shutdown of the nuclear reactor), 3) cooling (e.g., removing residual heat from) a stored radioactive material in the nuclear fuel storage, and/or 4) confining a particular radioactive material within an enclosure of a container to suppress a release of the particular radioactive material from the container (e.g., reducing the potential for, and/or preventing, release of radioactive material from the nuclear power plant to the environment or the public and to ensure that any releases are within prescribed limits).

As described herein, support equipment ("auxiliary support systems") of a nuclear power plant configured to cause one or more "fundamental safety functions" to be performed may include frontline support equipment that perform the fundamental safety functions and initiating support equipment that trigger the frontline support equipment to perform the fundamental safety functions. Frontline support equipment may include, for example, emergency core cooling equipment, residual heat removal equipment, emergency power supplies, etc. Examples of frontline support equipment may include the reactor protection system which includes support equipment configured to cause a scram of the nuclear reactor to occur and/or support equipment configured to isolate one or more portions of the nuclear reactor and/or nuclear fuel storage and/or to isolate an enclosure of a container to suppress release of radioactive material from the enclosure. Initiating support equipment may include processing circuitry configured to selectively generate and/or transmit a "trigger" control signal to the frontline support equipment to trigger the frontline support equipment to perform a fundamental safety function. Said processing circuitry may include a memory storing a program of instructions and a processor configured to execute the program of instructions to generate and/or transmit the "trigger" control signal in response to a determination that a damaging event is detected. In some example embodiments, the initiating support equipment including detection equipment (e.g., a sensor, communication interface, or the like) configured to detect the occurrence of the damaging event. In some example embodiments, the initiating support equipment includes instrumentation equipment (e.g., sensor devices, signal transmitters), electrical equipment (e.g., transformers, switchgear, etc.), communication equipment (e.g., wireless communication transceivers), and/or control equipment (e.g., processing circuitry, user interfaces, etc.). Initiating support equipment and frontline support equipment which said initiating support equipment is configured to trigger may be located in separate structures and/or may be communicatively linked via a wired or wireless communication connection.

Initiating support equipment may be configured to trigger a frontline support equipment based on transmitting a "trigger" control signal to the frontline support equipment (e.g., when the initiating support equipment includes processing circuitry and a transmitter configured to generate and transmit the control signal via a communication link to the frontline support equipment), performing an actuation operation (e.g., when the initiating support equipment includes an actuator and/or other device, such as a spring, electromagnet, or the like that is configured to operate to actuate at least a portion of the frontline support equipment to cause the frontline support equipment to perform a fundamental safety function), or any combination thereof.

In some example embodiments, at least some support equipment configured to cause fundamental safety functions to be performed, even if classified "safety related," under U.S. 10 CFR Part 50 or equivalent classification in other countries' law(s), may not need to be located in protected structures.

For example, the frontline support equipment may be configured to perform/satisfy a fundamental safety function, in response to being triggered by the initiating support equipment, independently of the initiating support equipment subsequent to the triggering. As a result, the initiating support equipment may not need to be located in a protected structure, as performance of the fundamental support function may continue independently of the continued operation, survival, and/or existence of the initiating support equipment subsequent to the triggering of the frontline support equipment to perform the fundamental support function.

This facilitates adoption of a distributed modular nuclear power plant layout architecture, where systems (e.g., support equipment) that do not need to be located in protected structures are distributed to be located in support structures (e.g., non-protected structures) that are spatially separate from structures housing systems that do need to be located in protected structures (e.g., nuclear reactor), because such distribution enables the nuclear power plant having such distribution to be more economically attractive. For example, initiating support equipment may be located in a support structure, while the frontline support equipment that may be triggered by the initiating support equipment to perform a fundamental safety function may be located in a protected structure (e.g., a nuclear structure, including a nuclear reactor building, fuel handling building, auxiliary building, a satellite structure, or some combination thereof).

A summary of operations where the fundamental safety functions are performed/satisfied is provided below with reference to at least FIGS. 4-7.

Initiation/Triggering of Fundamental Safety Functions

Figure 4:
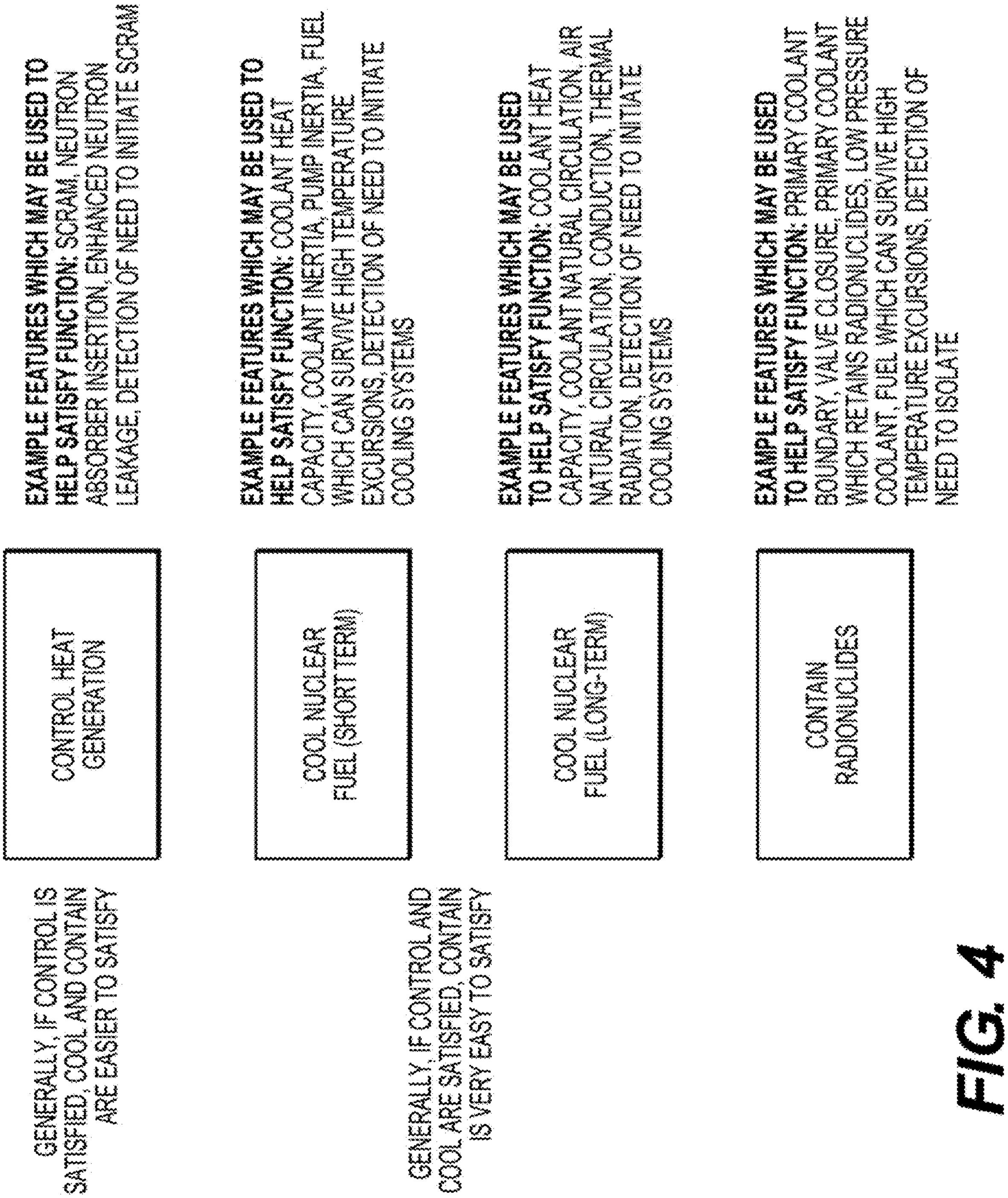
FIG. 4 is a block diagram illustrating fundamental safety functions and features that may be used to satisfy the fundamental safety functions, according to some example embodiments.
Figures 5A, 5B:
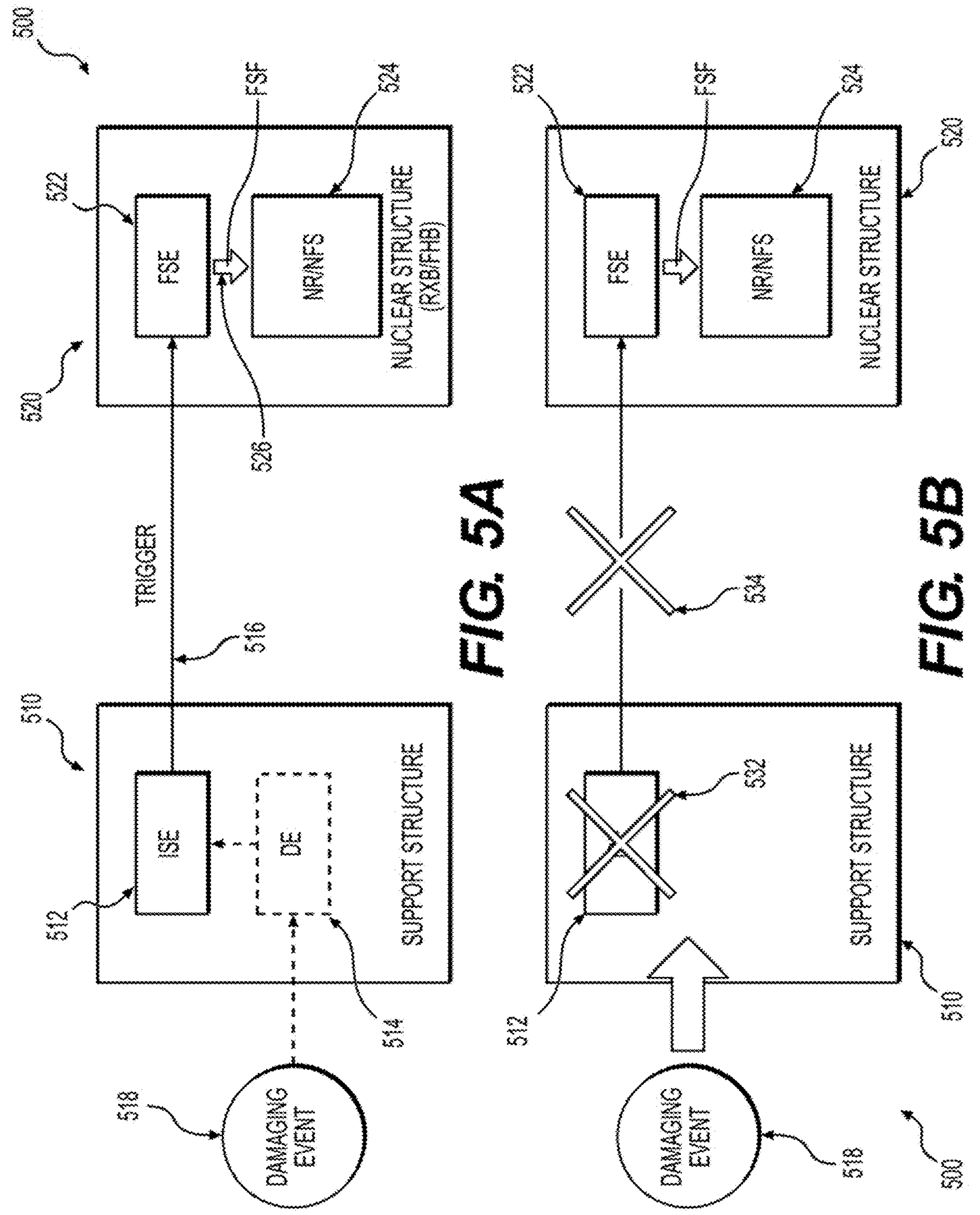
FIGS. 5A and 5B illustrate operation of initiating support equipment to trigger frontline support equipment to perform a fundamental safety function in response to detection of a damaging event, according to some example embodiments.
Figure 6A:
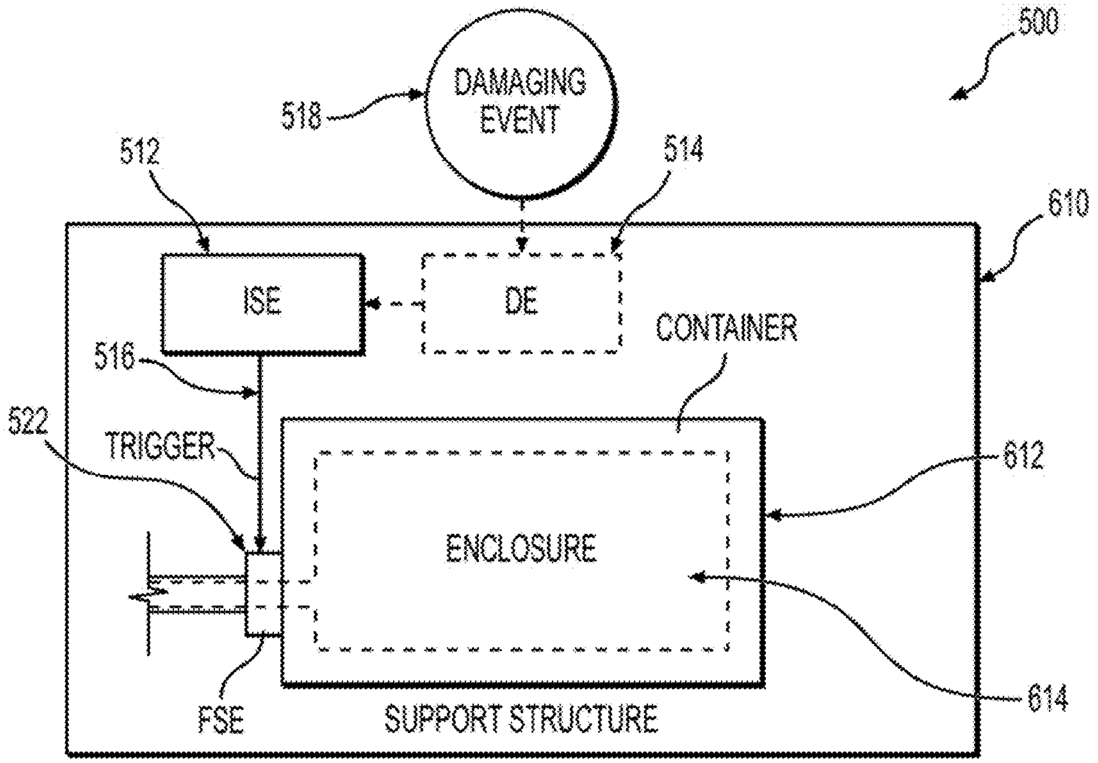
FIGS. 6A and 6B illustrate operation of initiating support equipment to trigger frontline support equipment to perform a fundamental safety function in response to detection of a damaging event, according to some example embodiments.
Figure 6B:
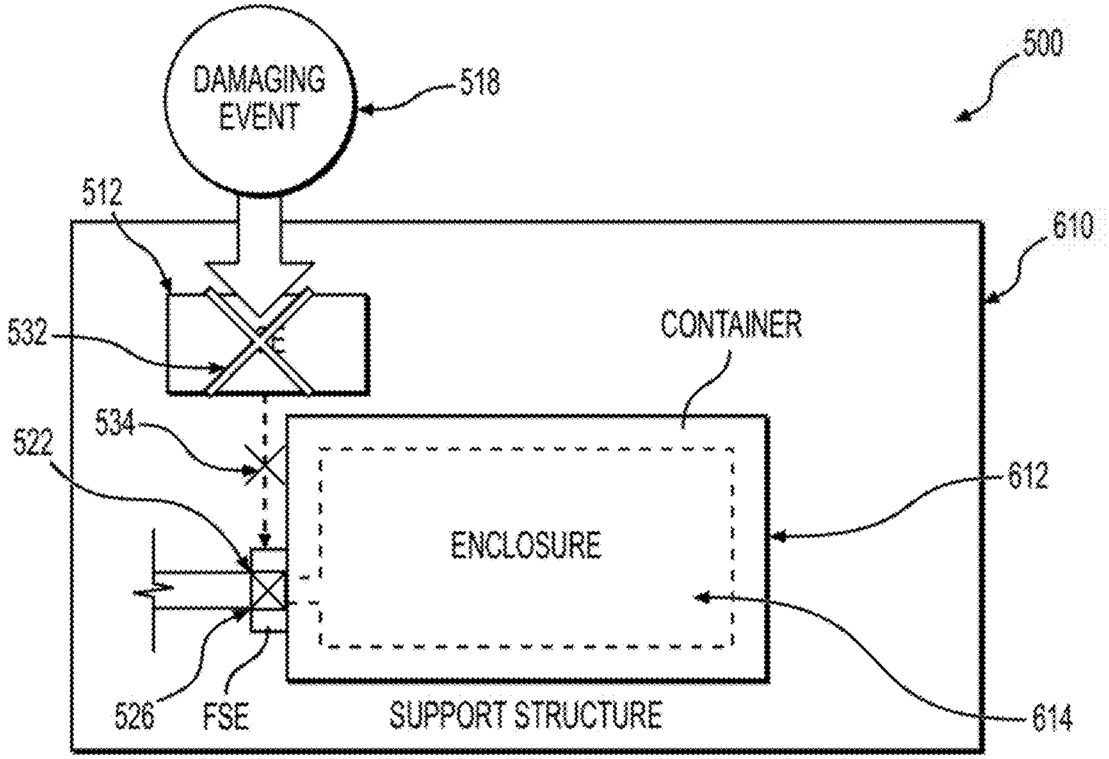
Figure 7:
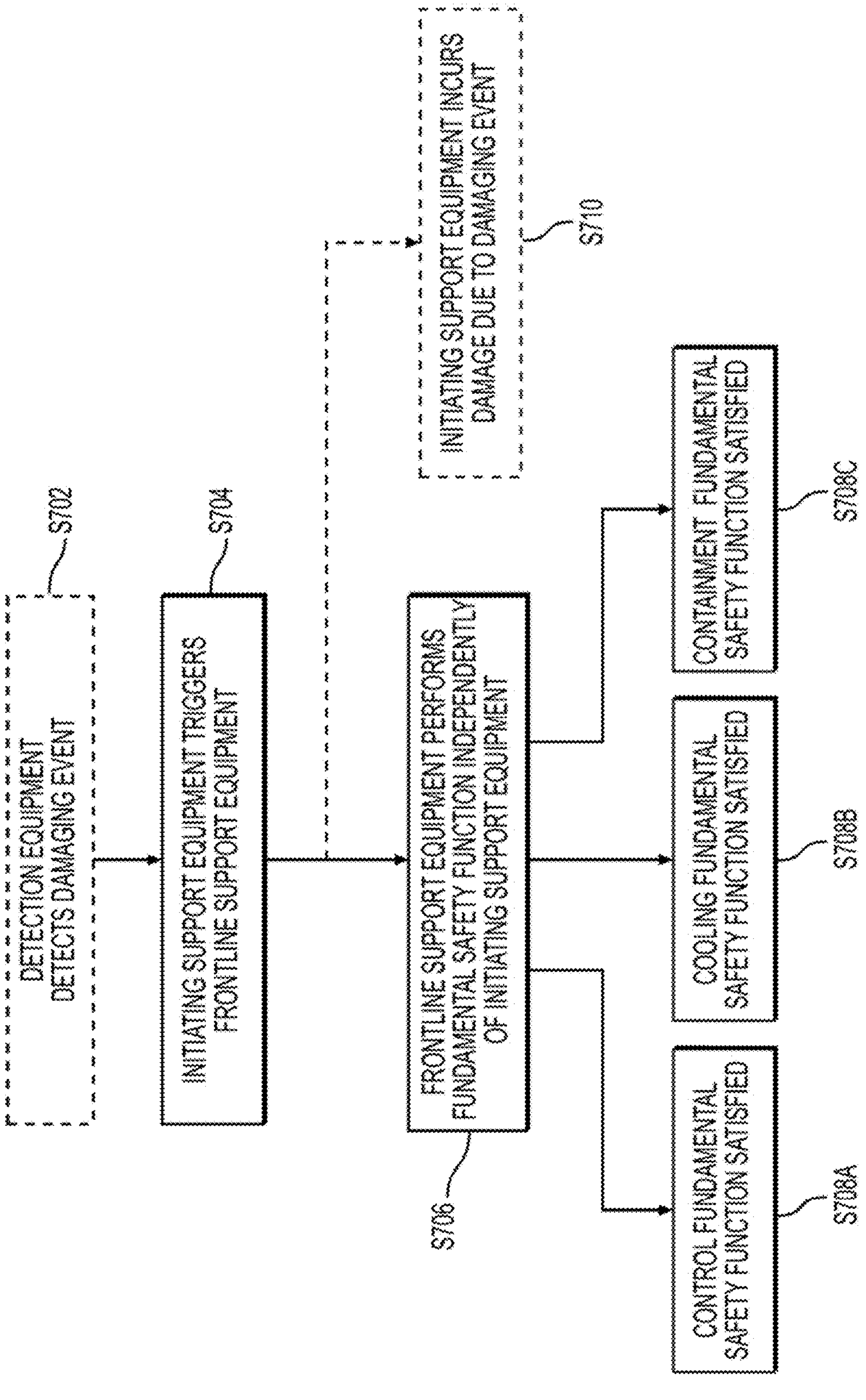
FIG. 7 is a flowchart illustrating a method of operation of a nuclear power plant to cause one or more fundamental safety functions to be performed in response to detection of a damaging event, according to some example embodiments.

Referring to FIG. 7, which is a method that may be performed with regard to any nuclear plant, initiating and/or frontline support equipment, or the like according to any example embodiments (e.g., as shown in FIGS. 5A-5B and/or FIGS. 6A-6B), an event (e.g., damaging event) may, upon detection (e.g., at S702 by detection equipment), prompt an initiating support equipment to trigger a frontline support equipment (e.g., at S704) to perform a fundamental safety function (e.g., at S706) independently of the initiating support equipment subsequent to the triggering at S704, such that the fundamental safety function (e.g., one or more of the fundamental safety functions illustrated in FIG. 4) may be performed (e.g., at S706) and satisfied (e.g., one or more of S708A, 5708B, or 5708C) even if the initiating support equipment incurs damage and/or becomes inoperative due to the damaging event subsequent to the triggering (e.g., at S710).

Restated, the method shown in FIG. 7 may include, at S702, detecting a damaging event originating externally to a nuclear structure of the nuclear power plant and associated with damage being incurred by one or more portions of the nuclear power plant, wherein the nuclear structure is a protected structure configured to protect the at least one of the nuclear reactor or the nuclear fuel storage from incurring damage due to the damaging event; and, at S704, controlling an initiating support equipment to trigger a frontline support equipment to perform a fundamental safety function at S706 in response to the detecting the damaging event at S702, such that the fundamental safety function is performed independently of the initiating support equipment subsequent to the triggering, the initiating support equipment located in a support structure that is spatially separate (also referred to herein interchangeably as "structurally independent") from the nuclear structure, wherein the fundamental safety function includes at least one of controlling a reactivity of the nuclear reactor (which may be satisfied at 5708A based on the frontline support equipment performing the fundamental safety function at S706), cooling a reactor radioactive material in the nuclear reactor (which may be satisfied at S708B based on the frontline support equipment performing the fundamental safety function at S706), cooling a stored radioactive material in the nuclear fuel storage (which may be satisfied at S708B based on the frontline support equipment performing the fundamental safety function at S706), or confining a particular radioactive material within an enclosure of a container to suppress a release of the particular radioactive material from the container, for example to the environment or the public (which may be satisfied at S708C based on the frontline support equipment performing the fundamental safety function at S706).

The detecting at S702 may include detecting a damaging event originating externally to the nuclear structure and associated with damage being incurred by one or more portions of the nuclear power plant, wherein the nuclear structure is a protecting structure configured to protect the at least one of the nuclear reactor or the nuclear fuel storage from incurring damage due to the damaging design level event can have significant adverse consequences on the environment and the public as defined by ANSI/ANS-2.26-2004, such that the triggering at S704 is performed (e.g., by the initiating support equipment) in response to such detecting.

Referring to FIGS. 5A-6B, a nuclear power plant 500 may include initiating support equipment (ISE) 512 that may include and/or be communicatively coupled to detection equipment (DE) 514 configured to detect a damaging event 518. The detection equipment (DE) 514 may include, for example, a known seismic trip system configured to detect a seismic event, a known system configured to monitor the local weather for weather events, a known intrusion detection system configured to detect an attack on the nuclear power plant, or the like.

Still referring to FIGS. 5A-6B, the support equipment may include initiating support equipment (ISE) 512 configured to "trigger" 516 frontline support equipment (FSE) 522 in response to detection of a damaging event 518 (e.g., by DE 514), for example based on transmitting a "trigger" control signal (516) to the frontline support equipment 522 and/or actuating the frontline support equipment 522. The initiating support equipment ISE 512 may be configured to trigger 516 the FSE 522 to perform the fundamental safety function 526 prior to a nuclear reactor, nuclear fuel storage, and/or radioactive material (e.g., structure 524), or one or more portions of the nuclear power plant 500 being affected (e.g., damaged) due to the damaging event 518. In some example embodiments, the initiating support equipment 512 is located in a support structure 510 that may be a non-protected structure that is not configured to protect the initiating support equipment 512 from incurring damage 532 due to the damaging event 518. The detection equipment (DE) 514 may be configured to detect the damaging event 518 with sufficient advance timing before the damaging event 518 may cause the ISE 512 to incur damage 532 (e.g., at least 5 seconds, 10-20 seconds, etc.), and the ISE 512 may be configured to trigger the frontline support equipment (FSE) 522 to perform one or more fundamental safety functions 526 within said advance timing, so that the ISE 512 may trigger 516 frontline support equipment (FSE) 522 to perform one or more fundamental safety functions (FSF) 526 and such triggering 516 may be completed prior to the ISE 512 (and/or the FSE 522, nuclear reactor, nuclear fuel storage, or the like) incurring damage 532 due to the damaging event that would inhibit (534) the ISE 512 from performing said triggering 516. Restated, and as shown in FIGS. 5A-6B (particularly in FIGS. 5B and 6B), the initiating support equipment ISE 512 may be not configured to resist incurring damage 532 due to the damaging event 518, and the initiating support equipment ISE 512 may be configured to trigger 516 the frontline support equipment FSE 522 to perform the fundamental safety function FSF 526 in response to detection of the damaging event 518 (e.g., by detection equipment DE 514) and prior to the initiating support equipment ISE 512 incurring damage 532 due to the damaging event, such that the fundamental safety function FSF 526 is performed/satisfied independently of damage 532 incurred by the initiating support equipment ISE 512 due to the damaging event 518. Because the frontline support equipment FSE 522 may continue to perform the fundamental safety function 526 independently of the ISE 512 and subsequently to being triggered 516 by the ISE 512, damage 532 incurred by the ISE 512 subsequent to the triggering 516 may not affect the performance/satisfying of the fundamental safety function 526. Restated, because the frontline support equipment FSE 522 may be configured to assure the satisfying of the fundamental safety function 526 subsequent to the triggering 516 by the ISE 512, the ISE 512 may be located in a separate, non-protected support structure 510 wherein the ISE 512 is permitted to incur damage 532 which may inhibit 534 the ISE 512 from performing further triggering 516, so long as the ISE 512 is configured to trigger 516 the FSE 522 prior to incurring damage 532 due to the detected damaging event 518 that prompts the ISE 512 to perform the triggering 516.

As a result, and as shown in FIGS. 5A-6B, the ISE 512 may be located in an annex or support structure 510 that is non-protected and may be configured to not resist incurring damage due to the damaging event 518. For example, the nuclear structure 520 of the nuclear power plant 500 (e.g., RXB, FHB, etc.) may be configured to meet (e.g., meet requirements for) a first seismic design category (e.g., first-tier SDC that is at least one of SDC-3, SDC-4, or SDC-5 according to ANSI/ANS-2.26-2004 and/or ASCE/SEI 43-19, and the support structure 510 in which the initiating support equipment 512 is located may be configured to meet (e.g., meet requirements for) a second seismic design category (e.g., second-tier SDC) that is different from the first seismic design category. For example, the second-tier SDC may be at least one of Non-Seismic, SDC-1, or SDC-2 according to ANSI/ANS-2.26-2004, and/or ASCE/SEI 43-19. The nuclear structure 520 may be a protected structure that is designed in accordance with (e.g., configured to meet) the governing nuclear codes and standards such as ASME BPVC, ACI 349 and ANSI/AISC N690. The support structure 510 may be a non-protected structure that is designed in accordance with (e.g., configured to meet) non-nuclear industry codes such as IBC, ACI 318, and/or AISC 360

As shown in FIGS. 5A-6B, the ISE 512 may, based on "triggering" 516 the frontline support equipment 522, actuate the frontline support equipment 522 to perform the fundamental safety function(s) 526 prior to onset of damage 532 to the ISE 512 resulting from the damaging event 518 which may inhibit 534 the ISE 512 which may inhibit 534 the ISE 512 from performing further triggering 516.

In some example embodiments, the ISE 512 may include processing circuitry (e.g., memory such as a solid state drive (SSD) storing a program of instructions and a processor configured to execute the program of instructions to generate a "trigger" signal to trigger 516 a frontline support equipment 522 in response to detection of a damaging event 518), a communication interface (e.g., configured to transmit the trigger signal to the frontline support equipment 522), or the like.

In some example embodiments, the ISE 512 may include a manual shutdown device, switchgear (e.g., electrical and/or mechanical switchgear), actuator (e.g., valve actuator). The ISE 512 may be configured to actuate at least a portion of the frontline support equipment FSE 522 to trigger 516 the FSE 522 to cause the FSE 522 to perform the fundamental safety function 526 in a manner that is independent of the ISE 512 subsequent to the triggering 516.

In some example embodiments, the FSE 522 may include equipment that is configured to be located within a protected structure (e.g., nuclear structure 520) to be protected against damage by the damaging event 518, equipment that is configured to resist incurring damage by the damaging event 518, or the like. For example, the FSE 522 may include a control rod assembly configured to control reactivity of the nuclear reactor (e.g., 524) (e.g., via performing a scram) in response to a trigger signal and/or actuation received from an ISE 512 which may be located in a support structure 510. Because the control rod may be lowered into the nuclear reactor (e.g., 524) to perform the scram based on the electromagnet de-energizing in response to, or as part of, the triggering, the fundamental safety function 526 of a scram may be performed independently of the state/condition of the ISE 512 subsequently to the triggering 516 (e.g., as shown in FIGS. 5A-5B).

In another example, the FSE 522 may include stored energy equipment configured to implement one or more stored energy supply methods such as de-energize to actuate, gravity, springs, accumulators, capacitors or batteries which enable systems to perform fundamental safety function(s) 526 (e.g., an uninterruptible power supply (UPS)).

Figure 9:
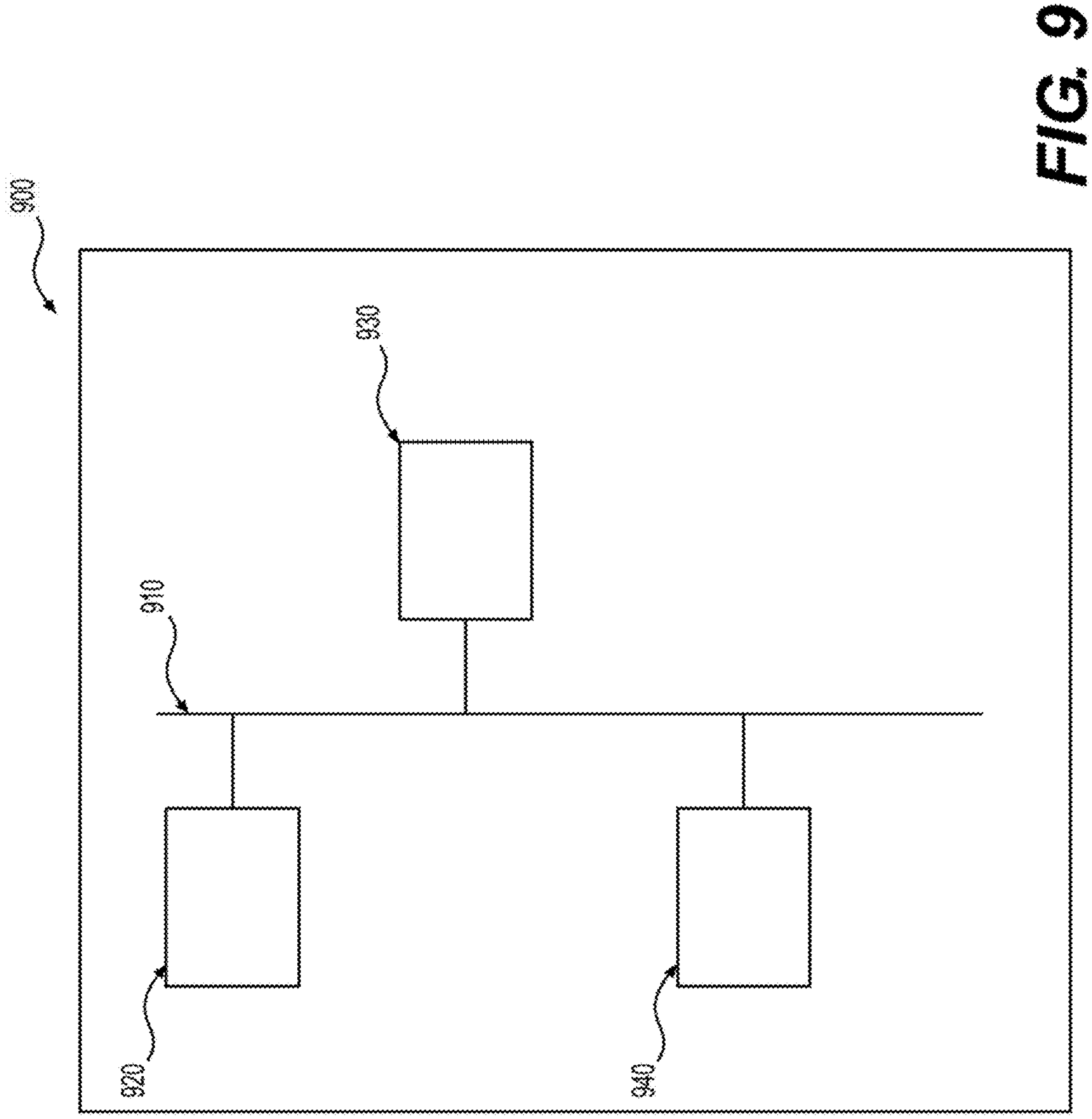
FIG. 9 is a block diagram of an electronic device and/or equipment according to some example embodiments.

FIG. 9 is a block diagram of an electronic device and/or equipment according to some example embodiments. Said electronic device and/or equipment may include and/or implement any of the devices, equipment, systems, units, controllers, and/or circuits included in any of the example embodiments, including any of the initiating support equipment (ISE) 512, frontline support equipment (FSE) 522, or the like. Said electronic device and/or equipment (referred to herein as simply a "device") may be configured to perform any or all of the operations of any of the methods according to any of the example embodiments, including without limitation any or all of the operations of any or all of the methods shown in FIGS. 5A, 5B, 6A, 6B, 7, 8A, and/or 8B.

Referring to FIG. 9, a device 900 (which may be an electronic device and/or equipment according to any of the example embodiments, including for example the initiating support equipment (ISE) and/or the frontline support equipment (FSE)) may include a processor 920, a memory 930, and an interface 940 that are electrically coupled together via a bus 910. The interface 940 may be a communication interface (e.g., a wired or wireless communication transceiver).

As shown in FIG. 9, where the device 900 is configured to perform one or more operations of a method according to any of the example embodiments, the interface 940 may be communicatively coupled to an external device. For example, where the device 900 includes and/or implements the initiating support equipment (ISE) 512, the interface 940 may be communicatively coupled to detection equipment 514 and may further be communicatively coupled to frontline support equipment (FSE) 522), such that the device 900 may receive information/signal indicating occurrence of a damaging event 518 from the detection equipment 514 data via the interface 940, process the received information/signal, and generate/transmit a trigger signal to the frontline support equipment (FSE) 522, to "trigger" 516 the FSE 522, via the interface 940 based on processing the received information/signal to determine that the FSE 522 should be actuated in response to the damaging event 518 detection.

The memory 930, which may be a non-transitory computer readable medium, may store a program of instructions and/or other information. The memory 930 may be a non-volatile memory, such as a flash memory, a phase-change random access memory (PRAM), a magneto-resistive RAM (MRAM), a resistive RAM (ReRAM), or a ferro-electric RAM (FRAM), or a volatile memory, such as a static RAM (SRAM), a dynamic RAM (DRAM), or a synchronous DRAM (SDRAM). The processor 920 may execute the stored program of instructions to perform one or more functions. For example, where the device 900 is included in and/or implements initiating support equipment (ISE) 512, the processor 920 may be configured to process signals/information received from the detection equipment via interface 940 and, based on a result of the one or more methods (e.g., determining for example an occurrence of a damaging event 518 based on the received information/signals), to selectively transmit commands to frontline support equipment (FSE) 522 via interface 940 to trigger 516 the frontline support equipment 522 to actuate to perform one or more fundamental safety functions 526. It will be understood that, in some example embodiments, the detection equipment 514 may be included as a part of the device 900 (e.g., a sensor device that is connected to the bus 910 within device 900). In another example, where the device 900 includes and/or implements the frontline support equipment (FSE) 522, the processor 920 may execute programs of instruction stored at the memory 930 to control one or more portions of the FSE 522 (e.g., a valve actuator) in response to processing a trigger signal received at the device 900 from initiating support equipment (ISE) 512 via the interface 940 to thus perform one or more fundamental safety functions 526.

The processor 920 may include processing circuitry such as hardware including logic circuits; a hardware/software combination such as a processor executing software; or a combination thereof. For example, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc. The processor 920 may be configured to generate an output (e.g., a command signal, for example a signal that is transmitted to an external device via interface 940, for example a trigger signal to trigger a frontline support equipment (FSE) to perform a fundamental safety function (FSF), a fundamental safety function transmitted by the frontline support equipment (FSE) to actuate a device to perform the FSF, etc.) based on such processing.

One or more of the processor 920, memory 930, and/or interface 940 may be included in, include, and/or implement one or more instances of processing circuitry such as hardware including logic circuits, a hardware/software combination such as a processor executing software; or a combination thereof. In some example embodiments, said one or more instances of processing circuitry may include, but are not limited to, a central processing unit (CPU), an application processor (AP), an arithmetic logic unit (ALU), a graphic processing unit (GPU), a digital signal processor, a microcomputer, a field programmable gate array (FPGA), a System-on-Chip (SoC) a programmable logic unit, a microprocessor, or an application-specific integrated circuit (ASIC), etc. In some example embodiments, any of the memories, image sensors, memory units, or the like as described herein may include a non-transitory computer readable storage device, for example a solid state drive (SSD), storing a program of instructions, and the one or more instances of processing circuitry may be configured to execute the program of instructions to implement the functionality of some or all of any of the processor 920, memory 930, interface 940, or the like according to any of the example embodiments as described herein, including performing any of the methods according to any of the example embodiments.

In some example embodiments, some or all of the systems, units, modules, devices, equipment, circuits, controllers, and/or elements thereof as described herein with reference to any of the drawings may include, may be included in, and/or may be implemented by one or more instances of processing circuitry such as hardware including logic circuits; a hardware/software combination such as a processor executing software; or a combination thereof. For example, the processing circuitry more specifically may include, but is not limited to, a central processing unit (CPU), an arithmetic logic unit (ALU), an application processor (AP), a microcomputer, a field programmable gate array (FPGA), and programmable logic unit, a microprocessor, application-specific integrated circuit (ASIC), a neural network processing unit (NPU), an Electronic Control Unit (ECU), and the like. In some example embodiments, the processing circuitry may include a non-transitory computer readable storage device, for example a solid state drive (SSD), storing a program of instructions, and a processor (e.g., CPU) configured to execute the program of instructions to implement the functionality of any of the elements of the systems, devices, and/or elements thereof as described herein, including without limitation the functionality of any portion of the testing systems, testing apparatuses, interface boards, devices under test, image sensors, electronic devices, or the like according to any of the example embodiments. It will be further understood that the processing circuitry may be configured to perform any of the methods as described herein, for example based on including include a non-transitory computer readable storage device, for example a solid state drive (SSD), storing a program of instructions, and a processor (e.g., CPU) configured to execute the program of instructions to implement ("perform") any or all of the operations of any of the methods according to any of the example embodiments, including without limitation any or all of the operations of any or all of the methods shown in FIGS. 5A, 5B, 6A, 6B, 7, 8A, and/or 8B.

As shown in FIGS. 5A-6B, in some example embodiments, in a nuclear power plant having a distributed modular layout architecture, buildings outside of (e.g., separate from) a protected structure 520 (e.g., a support structure 510) may not be required or configured to survive a damaging design event, and thus may not be structurally configured resist incurring damage (e.g., 532) due to the damaging event (e.g., may not be configured to be seismically or "tornado" qualified as the nuclear structures). This may be because, if such structures do include support equipment configured to cause a fundamental safety function 526 to be performed (e.g., ISE 512), said fundamental safety function 526 may be caused to be performed prior to or independently of damage occurring to the support structures and/or equipment included therein. For example, support structures and/or annex structures not structurally configured to survive a damaging event may house safe shutdown equipment. However, it will be understood that, in some example embodiments, buildings outside of the nuclear reactor building and the fuel handling building may still be configured to be seismically or "tornado" qualified and thus may be configured to survive a damaging event.

Control Fundamental Safety Functions

Referring to FIG. 4, FIGS. 5A-5B, and 5708A of FIG. 7, the nuclear power plant 500 may include frontline support equipment 522 configured to perform/satisfy a control fundamental safety function 526 that controls reactivity of a nuclear reactor (e.g., 524), for example cause shutdown of the nuclear reactor to be actuated passively through any combination of de-energization of an electromagnet, spring force, gravity, buoyancy or thermal expansion. These actuations act to either insert a neutron absorber into the core ("nuclear reactor core"), increase the rate of neutron absorption via materials already present in the core or increase the leakage of neutrons from the core (e.g., thermal expansion can decrease the density of fissile material reducing the rate or halting the fission). Such frontline support equipment 522 may be at least partially located within a nuclear structure 520 that includes the nuclear reactor.

Such a control fundamental safety function 526 (e.g., controlling reactivity) may cause the nuclear reactor to achieve zero power critical state or subcritical state based on neutron absorption or enhanced leakage shutdown methods prior to onset of damage to the support equipment and/or to the nuclear reactor due to the damaging event 518. In the zero power critical state fission is self-sustaining but suppressed to a sufficient level such that the heat generation rate from fission is negligible compared to the immediate radioactive decay heat generation rate. In the subcritical state fission is not self-sustaining therefore fission heat generation rate is practically zero and only the heat generation from radioactive decay may be removed by systems and components (e.g., frontline support equipment 522) providing (e.g., performing) the fundamental safety function 526 for cooling.

The frontline support equipment 522 configured to cause the nuclear reactor shutdown (zero power critical state or subcritical state) may be configured to cause the nuclear reactor shutdown to be maintained indefinitely once initiated without power, people, or control system action, thereby providing a control fundamental safety function 526 that protects the nuclear reactor.

The frontline support equipment 522 may be caused (e.g., triggered 516) to perform the control fundamental safety function 526 by initiating support equipment 512 (e.g., processing circuitry and a communication interface or transceiver, actuator, or the like) and the frontline support equipment 522 may, once triggered 516 by a control signal and/or actuation received from the initiating support equipment 512, perform and satisfy the fundamental safety function 526 independently of the continued operation and/or existence of the initiating support equipment 512. Accordingly, the initiating support equipment 512 may be located in a spatially separate (e.g., structurally independent) structure (e.g., support structure 510) that may incur damage 532 due to a damaging event 518 that, upon detection, prompts the initiating support equipment 512 to, prior to incurring damage 532 that may cause inhibition 534 due to the damaging event 518, trigger 516 the frontline support equipment 522 to perform the control fundamental safety function 526.

Cooling Fundamental Safety Functions

Still referring to FIG. 4, FIGS. 5A-5B, and 5708B of FIG. 7, the nuclear power plant 500 may include frontline support equipment 522 configured to provide long term cooling of fuel storage ("nuclear fuel storage") or the fuel inside the nuclear reactor (e.g., 524), thereby providing a cooling fundamental safety function 526 that protects the nuclear reactor and/or nuclear fuel storage. Said frontline support equipment 522 may be configured to provide cooling indefinitely, once triggered 516 by an initiating support equipment 512, without further power, people or control system action. In some example embodiments the frontline support equipment 522 providing long term cooling may not require initiation because it is always operating passively.

In some example embodiments, in response to the nuclear power plant 500 requiring a short term cooling of nuclear fuel storage or fuel inside the nuclear reactor, frontline support equipment 522 of the nuclear power plant 500 may be configured to provide a cooling fundamental safety function immediately or nearly immediately (e.g., 1-5 seconds) after triggering 516 of the frontline support equipment 522 by initiating support equipment 512, for example in response to detection of a damaging event 518, therefore prior to the onset of damage to the nuclear reactor, fuel storage, and/or support equipment resulting from the damaging event 518.

Redundant and locationally ("physically") separated copies of such frontline support equipment 522 configured to provide long term cooling of fuel storage or the fuel inside the nuclear reactor (e.g., physically isolated from each other, for example in separate buildings) may also be used to guard against inhibition of the fundamental safety functions 526 due to internal events such as explosions or maintenance accidents (crane collapse) within the nuclear power plant 500.

In some example embodiments, a cooling system of the nuclear power plant 500 (e.g., frontline support equipment 522 configured to provide cooling of the nuclear reactor and/or fuel storage) may not need to be isolated following the initial cooling system actuation, in contrast to, for example, a cooling system having valves that fail open or fail passively to assure long term cooling but may, later in the accident or during other events, need to be closed to prevent a loss of coolant accident and therefore fail to meet the cooling fundamental safety function 526.

The frontline support equipment 522 may be triggered to perform the cooling fundamental safety function 526 by initiating support equipment 512 (e.g., processing circuitry and a communication interface or transceiver, an actuator, or the like) and the frontline support equipment 522 may, once triggered 516 by the initiating support equipment 512, perform and satisfy the fundamental safety function 526 independently of the continued operation and/or existence (e.g., state and/or condition) of the initiating support equipment 512. Accordingly, the initiating support equipment 512 may be located in a spatially separate (e.g., structurally independent) structure (e.g., support structure 510) that may incur damage due to a damaging event 518 that, upon detection, prompts the initiating support equipment 512 to, prior to incurring damage 532 that may cause inhibition 534 due to the damaging event 518, trigger the frontline support equipment 522 to perform the cooling fundamental safety function 526.

Containment Fundamental Safety Function

Still referring to FIG. 4, FIGS. 6A-6B, and 5708C of FIG. 7, in some example embodiments, a nuclear power plant 500 may include frontline support equipment 522 configured to perform a fundamental safety function 526 to contain (e.g., isolate), for example to passively contain, high radionuclide quantities in a dispersible form which can exceed release limits. Restated, for example, the frontline support equipment 522 may be configured to perform a fundamental safety function 526 to confine a particular radioactive material within an enclosure 614 of a container 612 to suppress a release of the particular radioactive material from the container 612 (e.g., to the environment or the public). In some example embodiments, the container 612 is the nuclear reactor vessel. In some example embodiments, the container 612 is a separate container external to a nuclear structure and located in an annex structure or support structure 610. For example, the container 612 may be part of a high radionuclide radwaste system, where the container 612 is itself configured to resist incurring damage (e.g., collapse of support structure 610 onto container 612) due to a damaging event 518, such that the container 612 integrity is sufficient to suppress release of radioactive material when the enclosure 614 of the container 612 is isolated from an exterior of the container 612. The frontline support equipment 522 may thus include a valve that may be actuated to selectively isolate the enclosure 614 of the container 612 from the exterior of the container 612, thereby suppressing release of radioactive material from the container 612. The initiating support equipment 512 may include an actuator and/or be configured to actuate the valve to thus "trigger" 516 the valve of the frontline support equipment 522 to perform a containment fundamental safety function 526 to suppress release of radioactive material from the container 612. Because the container 612 may be itself configured to resist damage (e.g., breach of the enclosure 614) due to the damaging event 518, the container 612 and the associated frontline support equipment 522 (e.g., the valve) may be located in an annex structure or support structure 610 that is a non-protected structure, as the annex structure or support structure 610 is not needed to provide further protection of the container 612 from the damaging event 518.

In some example embodiments, a nuclear power plant may include a primary nuclear coolant which operates at atmospheric pressure with high inherent radionuclide retention, such that the nuclear power plant may omit containment structures which are pressure retaining. As a result, nuclear reactor-associated support equipment may be eliminated/omitted or reduced in safety importance, such that said support systems may be absent from "special protected structures," including being absent from a structure housing the nuclear reactor.

Example Embodiments

To realize the cost and schedule benefits of the distributed modular nuclear power plant layout architecture, a nuclear power plant according to some example embodiments may include one or more of the following features.

Figure 1B:
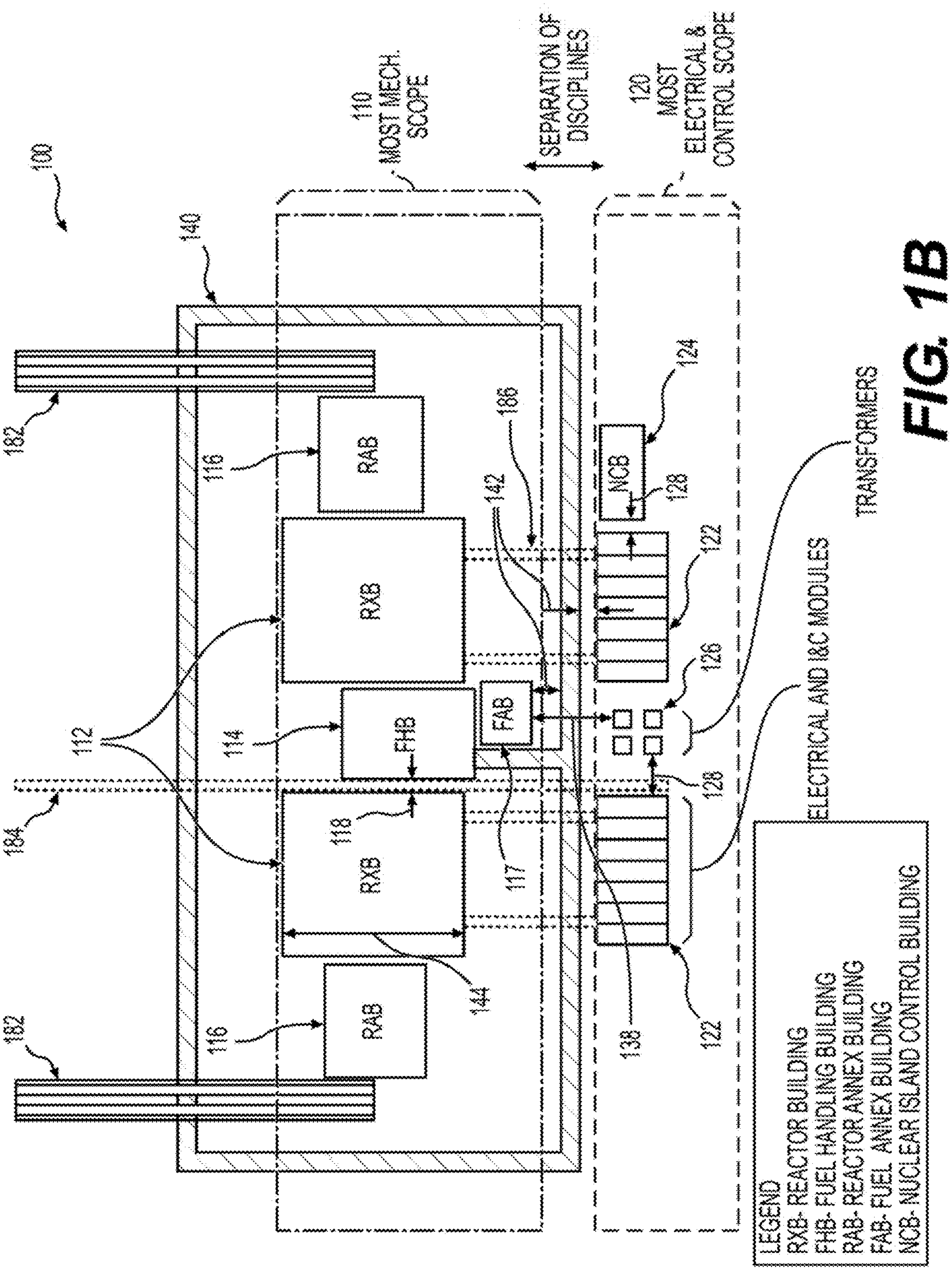

Referring to FIGS. 1A-1B and FIG. 2, in some example embodiments, the nuclear reactor building 112 (containing the nuclear reactor) and fuel handling/fuel storage buildings 114 (referred to herein as simply nuclear fuel storage, containing stored nuclear fuel elements) are the primary "protected structures" of the nuclear power plant 100 because they contain significant radionuclides and therefore fundamental safety functions must be assured to limit releases of radionuclides to levels below regulatory frequency-consequence targets.

Still referring to FIGS. 1A-1B and FIG. 2, in some example embodiments, a nuclear power plant 100 may include support equipment that may include some, most, or all heat transport, auxiliary and ancillary systems and components of the nuclear power plant which would traditionally be located within the nuclear reactor building 112 or fuel handling building 114 are moved to normal, non-protected structures (e.g., annex or support structures 116, 117, etc.). Heat transport systems are the main systems (e.g., heat exchangers, conduits, pipes, etc.) that transport heat (e.g., steam, molten salt, sodium, gas, etc.) to perform useful work (e.g., generate electricity or heat a chemical process). Example auxiliary and ancillary equipment ("support equipment," including frontline support equipment 522 and/or initiating support equipment 512) may include coolant cleanup equipment, standby power supplies and control equipment.

Still referring to FIGS. 1A-1B, and as also illustrated in FIG. 2, in some example embodiments, support equipment (e.g., initiating support equipment) including some, most, or all electrical and control equipment of the nuclear power plant 100 is consolidated in a few locations or a single location (e.g., in cluster 120) at a distance from most of the of the mechanical scope (e.g., in cluster 110. Most mechanical scope refers typically to reactor vessels, fuel storage pools, other vessels, tanks, pumps, fans, compressors, heat exchangers, valves, pipes, etc. As shown in at least FIGS. 5A-6B, safety related electrical and control equipment (e.g., initiating support equipment 512) can even be placed in normal industrial structures (e.g., support structure 510 and/or container 612 may include or be included in non-protected structures, for example reactor annex building 116, fuel annex building 117, control room 124, and/or certain e-rooms 122 as shown in FIG. 3B) rather than protected structures (e.g., protected buildings, for example nuclear structure 520 which may include or be included in nuclear reactor building 112, fuel handling building 114, and/or certain e-rooms 122 as shown in FIG. 3B) if the safety related electrical and control equipment (e.g., initiating support equipment 512) are configured to cause performance of fundamental safety functions 526 that may be satisfied (e.g., successfully performed) in response to detection of a damaging event 518 and prior to and/or independently of onset of damage 532 of said safety related electrical and control equipment that is caused by the damaging event 518.

In some example embodiments, and for example as shown in FIGS. 6A-6B, the nuclear power plant 500 may include support equipment that includes radioactive waste systems, which are configured to contain sufficient radionuclide quantities in a dispersible form which can exceed release limits, are located in special protected structures (e.g., "containers" 612). In some example embodiments, said radioactive waste systems (e.g., gaseous waste treatment using charcoal delay beds, liquid radioactive waste ("radwaste") systems using filters and demineralizers, liquid waste systems removing oxides from activated sodium) may be located within normal industrial ("non-protected") structures (e.g., support structures 610) and further contained within modular "indestructible" containment structures, or "containers" 612 (similar to aircraft black boxes).

In some example embodiments, and as shown in FIGS. 1A-1B and FIG. 2, the nuclear power plant 100 includes access roads 140 and construction laydown zones 150 that are provided to enable near-proximity delivery of large components to some or all of the structures of the nuclear power plant 100, thereby enhancing material flow.

In some example embodiments, and as shown in FIGS. 1A-1B and FIG. 2, the nuclear power plant 100 includes structures that have a standoff distance 142 (e.g., 5 meters) from access roads 140 to enable crane/workface access. In some example embodiments, and as shown in FIGS. 1A-1B and FIG. 2, some or all structures (e.g., buildings) of the nuclear power plant 100 have a width, length, or the like ("dimension" 144) that is equal to or less than a threshold dimension value (e.g., 30 meters) to enable use of smaller capacity cranes during construction of the nuclear power plant 100.

In some example embodiments, and as shown in FIGS. 1A-1B, FIGS. 2, and 3A-3B, some or (e.g., buildings) of the nuclear power plant are seismically separated (e.g., seismically decoupled), e.g., via distances 118, 128, and/or 138, even when adjacent, rather than being part of a continuous monolithic structure, to allow use of different seismic standards based on need. This also facilitates future design enhancements because adjacent buildings do not have to be significantly re-analyzed because they are not coupled as a monolithic structure would be.

In some example embodiments, the nuclear reactor as described herein may include any example embodiment of nuclear reactor, including but not limited to a liquid metal-cooled reactor (e.g., sodium-cooled reactor, including a sodium-cooled fast reactor).

Figure 3A:
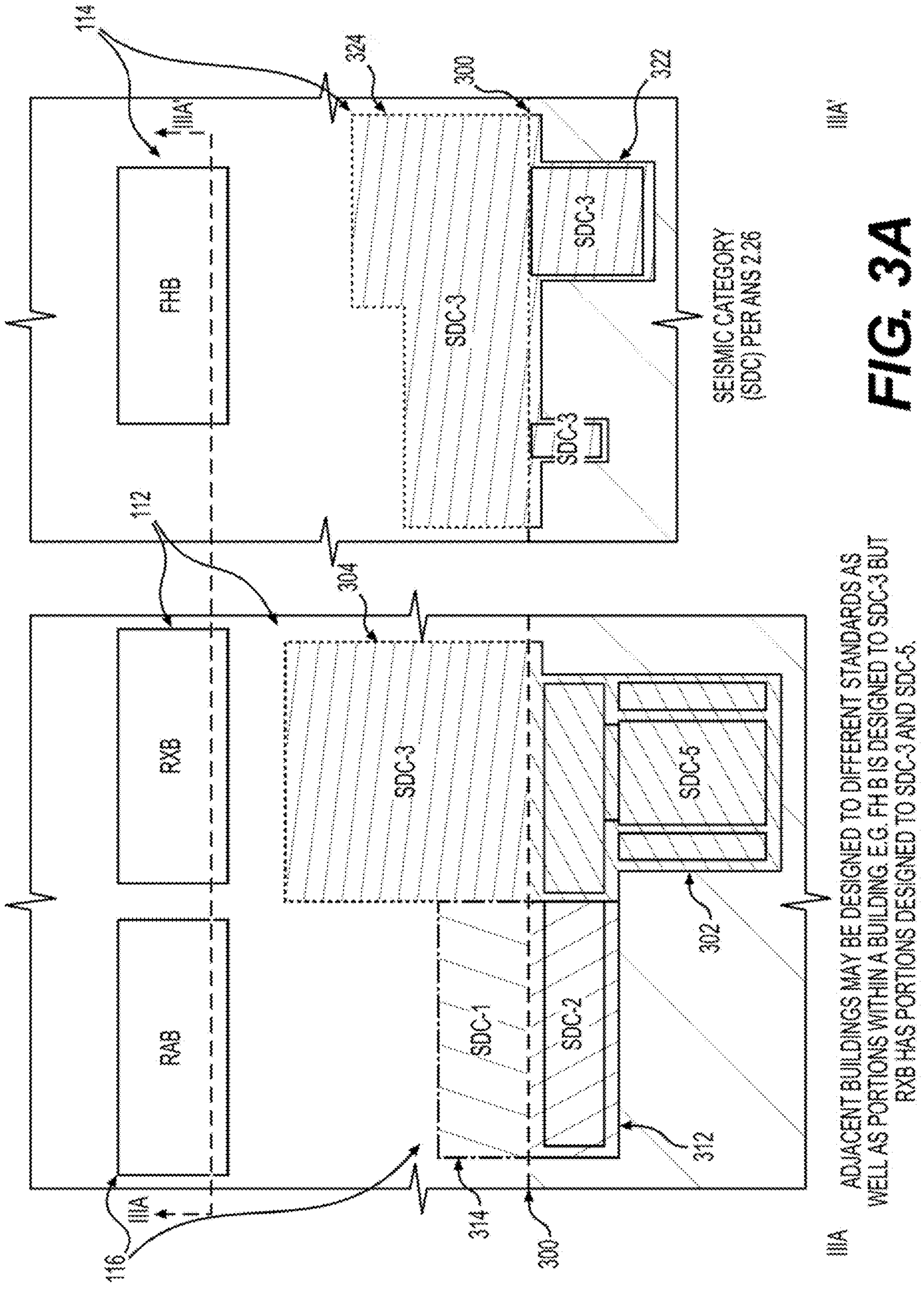
FIG. 3A is a cross-sectional view of one or more structures of a nuclear power plant having a distributed modular nuclear power plant layout, according to some example embodiments.
Figure 3B:
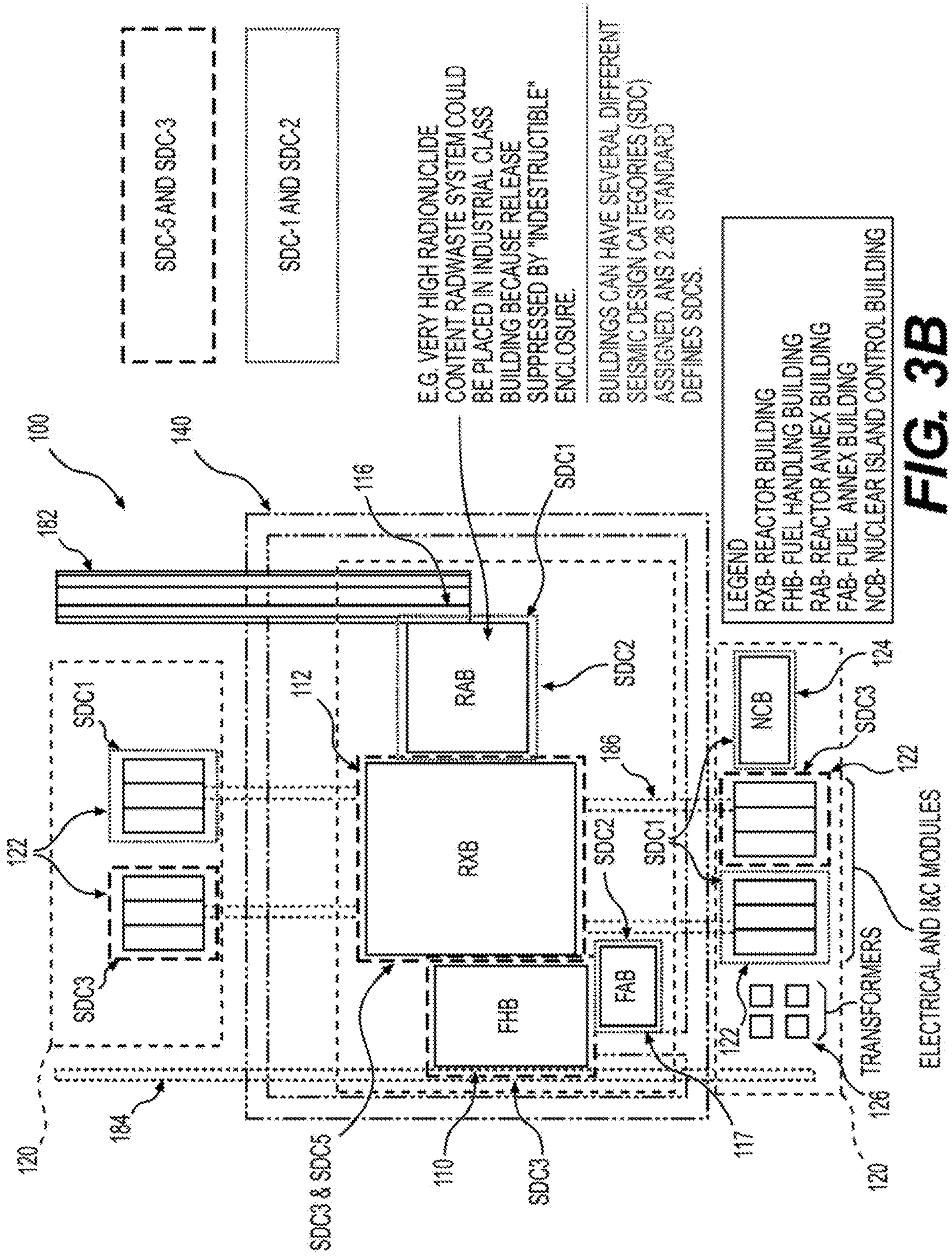
FIG. 3B is a plan schematic view of a nuclear power plant having a distributed modular nuclear power plant layout, according to some example embodiments.

As shown in FIGS. 3A-3B, a protected building (e.g., meeting SDC-3, SDC-5) that includes the nuclear reactor ("nuclear reactor building" (RXB) 112), where support equipment is located in a non-protected building (e.g., reactor annex building (RAB) 116, certain e-room(s) 122, etc., meeting SDC-1, SDC-2) may reduce or minimize excavation needed to complete the protected building during construction of the nuclear power plant 100. As shown, the nuclear reactor building 112 may be minimized to the nuclear reactor itself, excluding some or all other support equipment (e.g., some or all support equipment that is associated with limited radionuclide content therein) to be located in other, separate (e.g., non-protected) buildings. The nuclear reactor building 112 may be limited to equipment that present a significant source of radionuclides, including the nuclear reactor itself, the primary sodium purification system, etc. and may exclude, to separate (e.g., non-protected) buildings, support equipment associated with low radionuclide content therein (e.g., the primary cover gas purification system).

As shown in FIG. 3A, separate portions of a building may be configured to meet same or different nuclear safety requirements, design criteria, standards or the like. For example, as shown in FIG. 3A, a below-grade portion 302 of the nuclear reactor building (RXB) 112 that is below grade 300 may be configured to meet (e.g., is designed to) SDC-5 while an above-grade portion 304 that is above grade 300 may be configured to meet the less stringent SDC-3 but not SDC-5. In another example, as shown in FIG. 3A, a below-grade portion 312 of reactor annex building (RAB) 116 that is below grade 300 may be configured to meet SDC-2 while an above-grade portion 314 that is above grade 300 may be configured to meet the less stringent SDC-1 but not SDC-2. In another example, as shown in FIG. 3A, both a below-grade portion 322 and an above-grade portion 324 of the fuel handling building (FHB) 114) may be configured to meet SDC-3 and thus may be configured to meet a same standard.

As shown in FIGS. 3A-3B, a protected building (e.g., meeting SDC-3, SDC-5) that includes the nuclear fuel storage (e.g., fuel handling building (FHB) 114), may be minimized to handling and storage, and fuel pool cleanup equipment may be in a separate (e.g., non-protected) building (e.g., fuel annex building (FAB) 117), for example due to the fuel pool cleanup equipment being associated with low radionuclide content therein.

As referred to herein, a significant radionuclide content is a source that can result in a dose release to an individual at the site boundary in excess of regulatory limits, such as 25 rem per NRC requirements (10 CFR 50.34 or 52.79), and a limited radionuclide content is a source that cannot result in dose release to an individual that is excess of regulatory limits for normal plant operation such as NRC dose limits (10 CFR 20.1301).

While the initiating support equipment 512 is described herein as being included in a support structure and is shown as being included in a support structure 510, 610 in FIGS. 5A-6B, it will be understood that the initiating support equipment 512 and/or the frontline support equipment 522 may be included in any structure of the nuclear power plant 100, including one or more support structures, annex structures, satellite structures, nuclear structures and/or auxiliary structures. Accordingly, it will be understood that the descriptions herein regarding structure and/or operations performed with regard to initiating support equipment located in one or more support structures may be applied to some example embodiments wherein an initiating support equipment 512 is located in any structure of a nuclear power plant 100, 500, 800, 850, etc. having a distributed modular nuclear power plant layout architecture, including one or more support structures, annex structures, satellite structures, nuclear structures and/or auxiliary structures. Additionally, it will be understood that descriptions herein regarding structure and/or operations performed with regard to the frontline support equipment 522 may be applied to some example embodiments wherein a frontline support equipment 522 is located in any structure of a nuclear power plant having a distributed modular nuclear power plant layout architecture, including one or more support structures, annex structures, satellite structures, nuclear structures and/or auxiliary structures.

While a number of example embodiments have been disclosed herein, it should be understood that other variations may be possible. Such variations are not to be regarded as a departure from the spirit and scope of the present disclosure, and all such modifications as would be obvious to one skilled in the art are intended to be included within the scope of the following claims. In addition, while processes have been disclosed herein, it should be understood that the described elements of the processes may be implemented in different orders, using different selections of elements, some combination thereof, etc. For example, some example embodiments of the disclosed processes may be implemented using fewer elements than that of the illustrated and described processes, and some example embodiments of the disclosed processes may be implemented using more elements than that of the illustrated and described processes.

The invention claimed is:

1. A nuclear power plant, comprising:

a first cluster of buildings, the first cluster of buildings including a nuclear building, the nuclear building containing at least one of a nuclear reactor or a nuclear fuel storage pool, the nuclear building is configured to protect the at least one of the nuclear reactor or the nuclear fuel storage pool from incurring damage due to a damaging event, the damaging event originating externally to the nuclear building; and a second cluster of buildings, the second cluster of buildings including a support building, the support building being spatially separate from the nuclear building such that the support building is structurally independent of the nuclear building, the support building including an initiating support equipment, the initiating support equipment configured to trigger a frontline support equipment, the frontline support equipment is configured to continue to perform a fundamental safety function independently of the initiating support equipment once the frontline support equipment is initially triggered by the initiating support equipment, the fundamental safety function including at least one of controlling a reactivity of the nuclear reactor, cooling a reactor radioactive material in the nuclear reactor, cooling a stored radioactive material in the nuclear fuel storage pool, or confining a particular radioactive material within an enclosure of a container to suppress a release of the particular radioactive material from the container, wherein the first cluster of buildings includes the nuclear building and a separate first cluster building, the separate first cluster building spatially separate from the nuclear building such that the separate first cluster building is structurally independent of the nuclear building, the separate first cluster building including at least one of a reactor annex building, a fuel handling building, a fuel annex building, or any combination thereof, wherein the second cluster of buildings includes the support building and a separate second cluster building, the separate second cluster building spatially separate from the support building such that the separate second cluster building is structurally independent of the support building, the separate second cluster building including at least one of a transformer, an electrical supply from a balance of the nuclear power plant, a control room, an e-room including at least one of a switchgear, a unit substation, a motor control center, a protective relay, a battery system, an uninterruptible power supply, or an inverter, or any combination thereof, wherein the frontline support equipment is included within a building in the first cluster of buildings, wherein the first cluster of buildings and the second cluster of buildings are spatially separate from each other such that a smallest distance between a building of the first cluster of buildings and a building of the second cluster of buildings is at least 5 meters, wherein adjacent buildings of the first cluster of buildings are within 5 meters of each other, wherein adjacent buildings of the second cluster of buildings are within 5 meters of each other, and wherein the second cluster of buildings includes at least 80% of switchgears, unit substations, motor control centers, protective relays, battery systems, uninterruptible power supplies, and inverters in the nuclear power plant.

2. The nuclear power plant of claim 1, wherein the frontline support equipment is in the nuclear building.

3. The nuclear power plant of claim 1, wherein the initiating support equipment includes a manual shutdown device;

a switchgear;

an actuator; or a processor, a memory, and an interface that are electrically coupled via a bus, and the initiating support equipment is configured to trigger the frontline support equipment in response to the initiating support equipment receiving a signal from a detection equipment.

4. The nuclear power plant of claim 1, wherein the first cluster of buildings and the second cluster of buildings each include at least one first building configured to meet requirements for a first-tier Seismic Design Category (SDC) that is at least one of SDC-3, SDC-4, or SDC-5 according to at least one of ANSI/ANS-2.26-2004 or ASCE/SEI 43-19, and at least one second building configured to meet requirements for a second-tier SDC that is at least one of Non-Seismic, SDC-1, or SDC-2 according to at least one of ANSI/ANS-2.26-2004 or ASCE/SEI 43-19.

5. The nuclear power plant of claim 1, wherein the second cluster of buildings includes the e-room, the e-room includes modular electrical equipment buildings, the modular electrical equipment buildings are each road or rail shippable, and the modular electrical equipment buildings are mechanically fastened to a concrete slab.

6. The nuclear power plant of claim 1, wherein the nuclear building includes the nuclear reactor, the nuclear building is configured to meet requirements for a first-tier Seismic Design Category (SDC) that is at least one of SDC-3, SDC-4, or SDC-5 according to at least one of ANSI/ANS-2.26-2004 or ASCE/SEI 43-19, the separate first cluster building includes a heat exchanger configured to transport heat from the nuclear reactor to perform useful work, and the separate first cluster building is configured to meet requirements for a second-tier SDC, the second-tier SDC is at least one of Non-Seismic, SDC-1, or SDC-2 according to at least one of ANSI/ANS-2.26-2004 or ASCE/SEI 43-19.

7. The nuclear power plant of claim 1, wherein the nuclear building is configured to meet requirements for a first-tier Seismic Design Category (SDC) that is at least one of SDC-3, SDC-4, or SDC-5 according to at least one of ANSI/ANS-2.26-2004 or ASCE/SEI 43-19, and the separate first cluster building is configured to meet requirements for the first-tier Seismic Design Category (SDC).

8. The nuclear power plant of claim 1, wherein all structures in the nuclear power plant have a width or length that is less than 30 meters.

9. The nuclear power plant of claim 1, wherein the nuclear building includes a first basemat, and the separate first cluster building includes a second basemat that is separate from the first basemat of the nuclear building.

10. The nuclear power plant of claim 1, wherein the first cluster of buildings includes at least 80% of reactor vessels, fuel storage pools, tanks, pumps, fans, compressors, heat exchangers, valves, and pipes in the nuclear power plant.

11. A method for constructing a nuclear power plant having a distributed modular nuclear power plant layout architecture, the method comprising:

constructing a first cluster of buildings, the first cluster of buildings including a nuclear building, the nuclear building including at least one of a nuclear reactor or a nuclear fuel storage pool, the nuclear building is configured to protect the at least one of the nuclear reactor or the nuclear fuel storage pool from incurring damage due to an occurrence of a damaging event, the damaging event originating externally to the nuclear building; and constructing a second cluster of buildings, the second cluster of buildings including a support building that is spatially separate from the nuclear building such that the support building is structurally independent of the nuclear building, the support building including an initiating support equipment, the initiating support equipment configured to trigger a frontline support equipment, the frontline support equipment is configure to continue to perform a fundamental safety function independently of the initiating support equipment once the frontline support equipment is initially triggered by the initiating support equipment, the fundamental safety function including at least one of controlling a reactivity of the nuclear reactor, cooling a reactor radioactive material in the nuclear reactor, cooling a stored radioactive material in the nuclear fuel storage pool, or confining a particular radioactive material within an enclosure of a container to suppress a release of the particular radioactive material from the container, wherein the nuclear building and the support building are constructed at least partially concurrently, wherein the first cluster of buildings includes the nuclear building and a separate first cluster building, the separate first cluster building spatially separate from the nuclear building such that the separate first cluster building is structurally independent of the nuclear building, the separate first cluster building including at least one of a reactor annex building, a fuel handling building, a fuel annex building, or any combination thereof, wherein the second cluster of buildings includes the support building and a separate second cluster building, the separate second cluster building spatially separate from the support building such that the separate second cluster building is structurally independent of the support building, the separate second cluster building including at least one of a transformer, an electrical supply from a balance of the nuclear power plant, a control room, an e-room including at least one of a switchgear, a unit substation, a motor control center, a protective relay, a battery system, an uninterruptible power supply, or an inverter, or any combination thereof, wherein the frontline support equipment is included within a building in the first cluster of buildings, wherein the first cluster of buildings and the second cluster of buildings are spatially separate from each other such that a smallest distance between a building of the first cluster of buildings and a building of the second cluster of buildings is at least 5 meters, wherein adjacent buildings of the first cluster of buildings are within 5 meters of each other, wherein adjacent buildings of the second cluster of buildings are within 5 meters of each other, and wherein the second cluster of buildings includes at least 80% of switchgears, unit substations, motor control centers, protective relays, battery systems, uninterruptible power supplies, and inverters in the nuclear power plant.

12. The method of claim 11, wherein the frontline support equipment is in the nuclear building.

13. The method of claim 11, wherein the initiating support equipment includes a manual shutdown device;

a switchgear;

an actuator; or a processor, a memory, and an interface that are electrically coupled via a bus, and the initiating support equipment is configured to trigger the frontline support equipment in response to the initiating support equipment receiving a signal from a detection equipment.

14. The method of claim 11, wherein the first cluster of buildings and the second cluster of buildings each include at least one first building configured to meet requirements for a first-tier Seismic Design Category (SDC) that is at least one of SDC-3, SDC-4, or SDC-5 according to at least one of ANSI/ANS-2.26-2004 or ASCE/SEI 43-19, and at least one second building configured to meet requirements for a second-tier SDC that is at least one of Non-Seismic, SDC-1, or SDC-2 according to at least one of ANSI/ANS-2.26-2004 or ASCE/SEI 43-19.

15. The method of claim 11, wherein the second cluster of buildings includes the e-room, the e-room includes modular electrical equipment buildings, the modular electrical equipment buildings are each road or rail shippable, and the modular electrical equipment buildings are mechanically fastened to a concrete slab.

* * * * *